(12) United States Patent
Yamauchi

(10) Patent No.: US 8,763,882 B2
(45) Date of Patent: Jul. 1, 2014

(54) FRICTION STIR WELDING METHOD FOR METAL MATERIAL AND METAL MATERIAL WELDED BODY OBTAINED THEREBY

(71) Applicant: Suzuki Motor Corporation, Shizuoka-Ken (JP)

(72) Inventor: Ryo Yamauchi, Shizuoka-Ken (JP)

(73) Assignee: Suzuki Motor Corporation, Hamamatsu-shi, Shizuoka-ken (JP)

( * ) Notice: Subject to any disclaimer, the term of this patent is extended or adjusted under 35 U.S.C. 154(b) by 0 days.

(21) Appl. No.: 13/928,482

(22) Filed: Jun. 27, 2013

(65) Prior Publication Data

US 2014/0004375 A1   Jan. 2, 2014

(30) Foreign Application Priority Data

Jun. 29, 2012   (JP) ................................. 2012-147622

(51) Int. Cl.
    *B23K 20/12*   (2006.01)
(52) U.S. Cl.
    USPC ........................................ 228/112.1; 428/544
(58) Field of Classification Search
    None
    See application file for complete search history.

(56) References Cited

U.S. PATENT DOCUMENTS

| 6,676,008 | B1 * | 1/2004 | Trapp et al. | 228/112.1 |
| 7,520,104 | B2 * | 4/2009 | Aota et al. | 52/783.1 |
| 2003/0098336 | A1 * | 5/2003 | Yamashita | 228/112.1 |
| 2004/0084506 | A1 * | 5/2004 | Tanaka et al. | 228/112.1 |
| 2009/0001131 | A1 * | 1/2009 | Sunahara et al. | 228/2.1 |
| 2011/0308059 | A1 * | 12/2011 | Seo et al. | 29/428 |
| 2012/0181324 | A1 * | 7/2012 | Yamauchi et al. | 228/114 |
| 2012/0227890 | A1 * | 9/2012 | Yamauchi et al. | 156/73.5 |
| 2013/0233910 | A1 * | 9/2013 | Sato et al. | 228/114 |

FOREIGN PATENT DOCUMENTS

| JP | 2003-094174 A | * | 4/2003 |
| JP | 2004-154798 A | * | 6/2004 |
| JP | 2006239720 A | | 9/2006 |
| JP | 2008-188664 A | * | 8/2008 |
| JP | 2008-307570 A | * | 12/2008 |
| JP | 2009-160638 A | * | 7/2009 |
| JP | 2010-284703 A | * | 12/2010 |
| JP | 2010-284704 A | * | 12/2010 |
| JP | 2010-284706 A | * | 12/2010 |
| JP | 2011101890 A | | 5/2011 |
| JP | 2011101891 A | | 5/2011 |
| JP | 2011121090 A | | 6/2011 |
| JP | 2011-218363 A | * | 11/2011 |
| JP | 2012-166269 A | * | 9/2012 |
| JP | 20120166268 A | * | 9/2012 |
| JP | 2013-010141 A | * | 1/2013 |

* cited by examiner

*Primary Examiner* — Kiley Stoner
(74) *Attorney, Agent, or Firm* — Barnes & Thornburg LLP

(57) ABSTRACT

A friction stir welding method for a metal material for longitudinally welding members to be butted and then welded with complicated shape portions in section at end portions. The friction stir welding method includes preparing members to be welded and formed with excess thickness portions and a welding tool provided with a probe; performing a first welding to the members to be welded; inserting the welding tool from the excess thickness portion to cause plastic flow of the metal material subsequent to the butt-welding; and performing a second welding.

5 Claims, 24 Drawing Sheets

| ITEM | | PRODUCT OF PRESENT INVENTION | CONVENTIONAL PRODUCT |
|---|---|---|---|
| TOOL (10) | PROBE SHAPE | COLUMNAR SHAPE | COLUMNAR SHAPE |
| | SHOULDER DIAMETER (ΦA) | 12mm | 12mm |
| | PROBE DIAMETER (ΦB) | 6mm | 6mm |
| | PROBE LENGTH (L) | 6mm | 6mm |
| EXCESS THICKNESS PORTION | SHAPE | SEMI-COLUMNAR SHAPE R (6mm) | NO EXCESS THICKNESS PORTION |
| | LENGTH (Dc) | 4mm | |
| | DEPTH (D) | 12mm | |
| FRICTION STIRRING WELDING CONDITION | TOOL ROTATING SPEED | 1500rpm | 1500rpm |
| | TOOL INSERTING SPEED (HOLE FILLING STEP) | 20mm/min | 20mm/min |
| | TOOL FEED SPEED | 100mm/min | 100mm/min |

FIG. 20

FRICTION STIR WELDING METHOD FOR METAL MATERIAL AND METAL MATERIAL WELDED BODY OBTAINED THEREBY

PRIORITY CLAIM

This patent application claims priority to Japanese Patent Application No. 2012-147622, filed 29 Jun. 2012, the disclosure of which is incorporated herein by reference in its entirety.

BACKGROUND OF THE INVENTION

1. Field of the Invention

The present invention relates to a friction stir welding technique for longitudinally welding butted metal members with complicated (i.e., intricately) shape portions in section at end portions, and more specifically, relates to a friction stir welding method and metal material welded body manufactured by the method.

2. Description of the Related Art

Recently, a friction stir welding (FSW) technique has been developed and is in practical use as a new technique for joining members to be welded made of metal in place of welding and brazing technique.

The friction stir welding is a solid-phase joining technique in which members to be welded are stirred, softened, and plasticized without melting. In the friction stir welding, metal members as the members to be welded can be joined together with less thermal strain and less strength reduction in a base material than those in welding (fusion joining) and brazing (liquid phase-solid phase reaction joining) methods. Thus, weld failures caused by thermal deformation in welding or oxidation of a welded portion are advantageously reduced.

The friction stir welding is a joining technique in which a columnar or cylindrical joining tool called an FSW tool (referred hereinafter to as a welding tool) is pressed against the members to be welded while being rotated at high speed, and the members to be welded are stirred, softened, and plasticized to be joined together by use of frictional heat generated between the welding tool and the members to be welded.

In the normal friction stir welding, a weldable shape is limited to a flat surface or a gently curved surface due to its welding principle and the shape of the welding tool as disclosed in Patent Document 1 (Japanese Patent Laid-Open Publication No. 2011-101891) and Patent Document 2 (Japanese Patent Laid-Open Publication No. 2011-101890). If the members to be welded are provided with complicated shape portions such as an angular shape, a small round shape, and a stepped shape, the members to be welded are difficult to butt and longitudinally weld together by the normal friction stir welding technology.

Further, as shown in FIG. 1 (1A, 1B) and FIG. 2, in the friction stir welding performed to members to be welded with complicated shape portions such as an outer tube portion, weld surfaces (butt surfaces) 2 of the members to be welded 1 (1a and 1b) are welded through a plurality of welding steps which are divided in accordance with a complicated shape portion (an angular portion) 3 of the members.

However, in the friction stir welding technique, a friction stir welded portion 4 obtained by stirring, melting, softening, and fusing the members to be welded 1 (1a and 1b) is not formed over the entire butt surfaces 2 of the members to be welded 1, and an unwelded portion (portion which is not welded) 5 remains in the complicated shape portion 3. In the members to be welded 1 (1a and 1b), a probe hole 7 of a welding tool 6 also remains in a weld-end edge portion, or the unwelded portion 5 is formed and remains in the complicated shape portion (the angular portion) 3 after the respective welding steps as shown in FIG. 3. In such welding process, although a metal material welded body 8 having an angular shape is provided by butt-welding the members 1 (1a and 1b), the probe hole or the unwelded portion remains in a member surface of a stress concentration portion at which stress is concentrated in the welded body 8.

Patent Document 3 (Japanese Patent Laid-Open Publication No. 2006-239720) also discloses a welding method using a double-acting type friction stir welding apparatus 9 as shown in FIGS. 4A and 4B as a method for eliminating the probe hole 7 in the metal material welded body 8 for the friction stir welding technique. This welding method is performed by the following manner. The double-acting type friction stir welding apparatus 9 uses an elevating device that respectively separately lowers and raises a shoulder portion 9a and a probe portion 9b. The probe portion 9b is pulled up from the probe hole 7, and the shoulder portion 9a is simultaneously pushed down into the members to be welded 1 (1a and 1b) as workpieces after the welding process. A workpiece material is thereby caused to plastically flow into the probe hole 7 so as to fill the probe hole 7.

Furthermore, Patent Document 4 (Japanese Patent Laid-Open Publication No. 2011-121090) discloses a friction stir welding technique for a joint structure in which hollow members to be welded made of metal are butt-welded together by preventing deformation due to a tool load or the like as a welding example between the metal members with the complicated shape portions.

In the friction stir welding technique disclosed in Patent Document 3, however, when the members to be welded 1a and 1b have a large weld depth, the shoulder portion 9a needs to be pushed down more deeply so as to fill the probe hole 7. As a result, a shoulder hole 7a with a larger diameter remains even though the probe hole 7 is made shallow. The probe hole 7 may cause a greater strength reduction. Further, in the friction stir welding technique in Patent Document 4, it is necessary to form a protrusion on one of the members to be welded, and separately provide a support that supports the protrusion by receiving the protrusion on another one of the members to be welded so as to maintain formability of the metal members to be welded.

As described hereinbefore, in the conventional friction stir welding technique, the probe hole or the shoulder hole with a larger diameter remains in the weld-end edge portion, and the unwelded portion is formed and remains in the complicated shape portion (the angular portion) at a time when the members to be welded are butted and longitudinally welded together by using the welding tool, thereby providing poor weld strength, achieving insufficient mechanical and physical strength, and deteriorating appearance quality, thus being disadvantageous.

It is also necessary to separately additionally form the protrusion to one of the members to be welded, and the support for a protrusion, to which the protrusion is fitted, to the other one of the members to be welded in advance so as to suppress deformation and maintain the formability at a time when the metal members to be welded are butt-welded together. Thus, by the conventional method, it is difficult and time-consuming to machine butt-weld portions (joints) of the members to be welded since the butt-weld portions have an intricate (complicated) shape.

SUMMARY OF THE INVENTION

The present invention was made in consideration of the circumstances described above, and an object thereof is to provide a friction stir welding method for a metal material and a metal material welded body manufactured thereby, which can improve weld strength and weld quality of butt welding by eliminating a probe hole and an unwelded portion in the vicinity of an complicated shape portion in friction stir welding process in which members to be welded are butted and longitudinally welded together.

Another object of the present invention is to provide a friction stir welding method for a metal material and a metal material welded body, which can simplify a joint structure in which members to be welded are butt-welded together and improve mechanical and physical weld strength and appearance quality by eliminating a probe hole and an unwelded portion in the vicinity of an complicated shape portion.

The above and other objects can be achieved by providing, in one aspect, a friction stir welding method for a metal material for longitudinally welding members to be butted and then welded with complicated shape portions in section at end portions, the friction stir method including the steps of:

preparing members to be welded and formed with excess thickness portions and a welding tool provided with a probe for welding the members to be welded while rotating the welding tool in a manner of abutting against the members to be welded, the excess thickness portions being formed so as to protrude on extension surfaces of at least one side weld end portions of butt surfaces of the members to be welded;

performing a first welding to the members to be welded so as to weld the butt surfaces of the members to be welded along one side and terminating the butt welding by using the welding tool along the one side surfaces and terminating the first welding immediately before the excess thickness portions;

inserting the welding tool from the excess thickness portion to cause plastic flow of the metal material subsequent to the butt-welding along the one side to thereby fill a probe hole remaining in the first welding step after removing the welding tool from the members to be welded; and performing a second welding continuously from the filling step along another one side leading from the one side mentioned previously in the preparing step of the members to be welded.

In this aspect, it may be desired that the filling step is performed with a press jig in abutment with the weld-end portion on the one side mentioned in the first welding step.

In another aspect of the present invention, there is provided a friction stir welding method for a metal material longitudinally welding the members to be butted and then welded, each of the members having rectangular sectional shape to be welded, the welding method including the steps of:

preparing members to be welded having rectangular sectional shape each having four side surfaces and formed with excess thickness portions and a welding tool provided with a probe for welding the members to be welded while rotating the welding tool in a manner of abutting against the members to be welded, the excess thickness portions being formed so as to protrude on extension surfaces of side surfaces of the rectangular member which at least includes an excess thickness portion formed at least one side surface of an extension surface of a first side of the four side surfaces of the rectangular members and on welding step for welding the rectangular members each having four side surfaces and a terminating side one surface of an extension surface of another surface subsequent to the welding of the first side surface;

performing a first welding to the members to be welded so as to weld the four butt surfaces of the members to be welded along one side and terminating the butt welding by using the welding tool along the one side surfaces and terminating the first welding immediately before the excess thickness portions;

inserting the welding tool from the excess thickness portion to cause plastic flow of the metal material subsequent to the butt welding along the one side to thereby fill a probe hole remaining in the first welding step after removing the probe from the first welding side surface of the members to be welded;

performing second welding continuously from the filling step along a lateral side continuous to the one side mentioned previously in the preparing step of the members to be welded after removing the prove from the next welding side surface of the members to be welded;

performing another first welding, as a first welding of a second welding step, of welding the butt surfaces of the members to be welded along another side opposite to the previous one side after termination of the second welding and terminating the butt welding along the another side immediately before a next excess thickness portion;

inserting the welding tool from a next excess thickness portion to cause plastic flow of a material subsequent to the butt welding along the another side opposing to the previous one side to thereby fill a probe hole remaining after the another first welding as first welding of the second welding step; and performing another second welding, as second welding of the second welding step, of butt-welding continuously from the another filling step, along another lateral side continuous to the another side, wherein in the second welding step and the another second welding step, the butt welding along the lateral side is terminated at a center portion of the lateral side by stopping the welding tool in mid-course or by stopping the welding tool after turning back the welding tool from a lateral edge.

In a further aspect of the present invention, there is provided a friction stir welding method for a metal material for longitudinally welding butted members to be welded having rectangular sectional shape, the friction stir welding method including the steps of:

preparing members to be welded having rectangular sectional shape each having four sides and formed with excess thickness portions and a welding tool provided with a probe for welding the members to be welded while rotating the welding tool in a manner of abutting against the members to be welded, the excess thickness portions being formed so as to protrude on extension surfaces of side weld end portions of four butting side surfaces of the members to be welded, respectively;

performing a first welding to the members to be welded so as to weld the four butting side surfaces of the members to be welded along one side and terminating the butt welding by using the welding tool along the one side surfaces of the members to be welded and terminating the first welding immediately before first excess thickness portions;

inserting the welding tool from the excess thickness portion to cause plastic flow of the metal material subsequent to the butt-welding along the one side to thereby fill a probe hole remaining in the first welding step after removing the probe from the members;

performing second welding continuously from the filling step along a lateral side continuous to the one side mentioned previously in the preparing step of the members to be welded, and terminating the butt-welding to the continuous lateral side immediately before a second excess thickness portion;

inserting the welding tool from the second excess thickness portion to cause plastic flow of a material subsequent to the butt welding along the another side opposing to the previous one side to thereby fill a probe hole remaining after the another first welding;

performing a third welding of welding the butting surfaces of the members to be welded along another side opposite to the previous one side after the termination of filling the probe hole remaining in the second welding and terminating the butt welding along the another side immediately before a third excess thickness portion;

inserting the welding tool from the third excess thickness portion to cause plastic flow of a material subsequent to the butt welding along the another side to thereby fill a prove hole remaining the another side surface after the third welding step; and welding the butt surfaces of the members to be welded along another lateral side opposite to the previous lateral side continuously from the another-side probe hole filling step, and terminating the butt welding along the another lateral side at a center portion of the another lateral side by stopping the welding tool in mid-course or by stopping the welding tool after turning back the welding tool from a lateral edge.

In the above aspects, it may be desired that the excess thickness portion is removed by machining working after the termination of the welding in the friction stir welding in which the members to be welded are butt-welded along the longitudinal direction.

The present invention further provides a metal material welded body to be obtained by longitudinally welding butted members to be welded made of a metal material and provided with complicated shape portions in section at end portions by a friction stir welding method, wherein each of the members to be welded is provided integrally with an excess thickness portion that protrudes as an extension of a weld-end edge portion on at least one side of a butt surface, a butt welding process along at least one side of the members to be welded by a welding tool provided with a probe, while rotating the welding tool in a manner abutting against the members to be welded, is terminated immediately before the excess thickness portion when the butt surfaces of the members to be welded are welded together, a probe hole remaining in the weld-end edge portion formed by removing the probe from the members during the friction stir welding on the one side is filled by plastic flow of a material caused by inserting the welding tool from the excess thickness portion subsequent to the butt welding along the one side, and the excess thickness portion is removed by machining after termination of the friction stir welding.

In the above aspect, it may be desired that the members to be welded each has a rectangular shape in section, and weld surfaces of the members to be welded are butt-welded sequentially along four sides of the members by the welding tool.

Effects of the Invention

According to the present invention of the characters mentioned above, in the friction stir welding in which the members to be welded made of a metal material are butted and welded together along the longitudinal direction of the members, the butt welding can be performed with no probe hole and no unwelded portion remaining in the vicinity of the complicated shape portion of the members. Accordingly, the weld strength and weld quality of the butt welding between the members to be welded can be improved.

Furthermore, in accordance with the present invention, a joint structure in which the members to be welded are longitudinally butt-welded can be simply manufactured without using welding or brazing. The metal material welded body can be provided by the friction stir welding without remaining any probe hole and unwelded portion in the vicinity of the complicated shape portion. Thus, the mechanical and physical weld strength can be improved, and excellent appearance quality as weld product can be realized.

The nature and further characteristic features of the present invention will be made clearer from the following descriptions made with reference to the accompanying drawings.

BRIEF DESCRIPTION OF THE DRAWINGS

FIG. 1, including FIGS. 1A and 1B, illustrates conventional friction stir welding method for welding members to be welded, in which FIG. 1A is a sectional view illustrating a weld state between metal members to be welded provided with complicated shape portions (angular portions) and FIG. 1B is a plan view (viewed from upper side) illustrating the weld state between the members to be welded;

FIG. 4 includes FIGS. 4A and 4B, in which

FIG. 5, including

FIG. 8, including FIGS. 8A and 8B, illustrates the friction stir welding process according to the first embodiment, in which FIG. 8A is a view partially illustrating a member upper surface of the workpiece in which the members to be welded made of a metal material are butt-welded together, and FIG. 8B is a sectional view illustrating a weld section of the workpiece;

FIG. 11, including FIGS. 11A and 11B, is illustration for explaining a welding first step of the friction stir welding in the first embodiment, in which FIG. 11A is a partial upper view of the members to be welded, and FIG. 11B is a partial sectional view of the members to be welded;

FIG. 14, including FIGS. 14A and 14B, illustrates a first modification for explaining the filling step of the friction stir welding in the first embodiment, in which FIG. 14A is a partial side view of the members to be welded, and FIG. 14B is a partial sectional view of the members to be welded;

FIG. 20 is a table explaining conditions for use of a welding tool, and conditions of a friction stir welding or the like in the fourth embodiment of the present invention;

DESCRIPTION OF THE PREFERRED EMBODIMENT

In the following, embodiments according to the present invention will be described with reference to the accompanying drawings.

The present invention relates to a friction stir welding technique for longitudinally butt-welding members to be welded made of a metal material and provided with complicated shape portions. A friction stir welding tool (referred to as a welding tool hereinafter) 10 shown in FIG. 5 is used as a joining tool in the friction stir welding (FSW).

With reference to FIG. 5, the welding tool 10 includes a columnar shoulder portion 11 and a probe portion 12 that is formed integrally with the shoulder portion 11 on a distal end (shoulder) surface 11a. The probe portion 12 is formed with a diameter smaller than the shoulder portion 11 and provided so as to rotate together with the shoulder portion 11. The welding tool 10 is driven to be rotated by a drive shaft, not shown, in the friction stir welding.

Figure 1A:
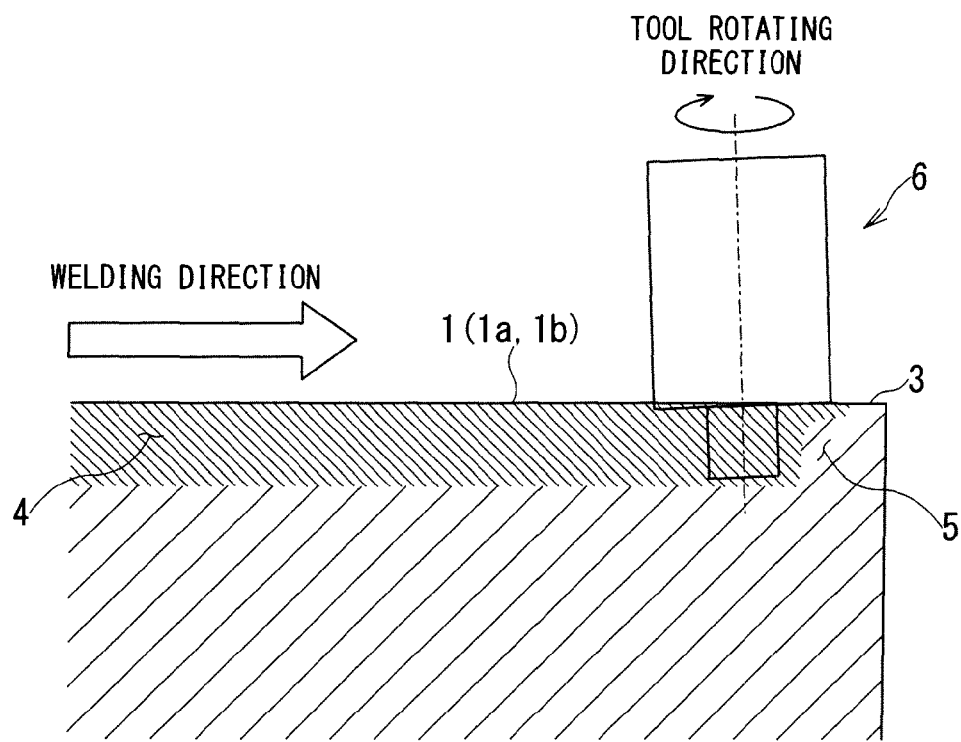
Figure 1B:
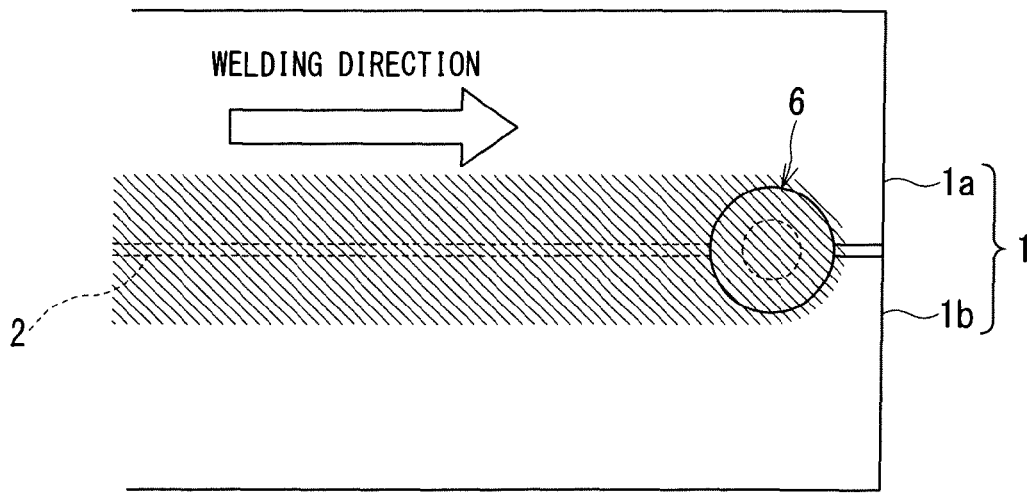
Figure 2:
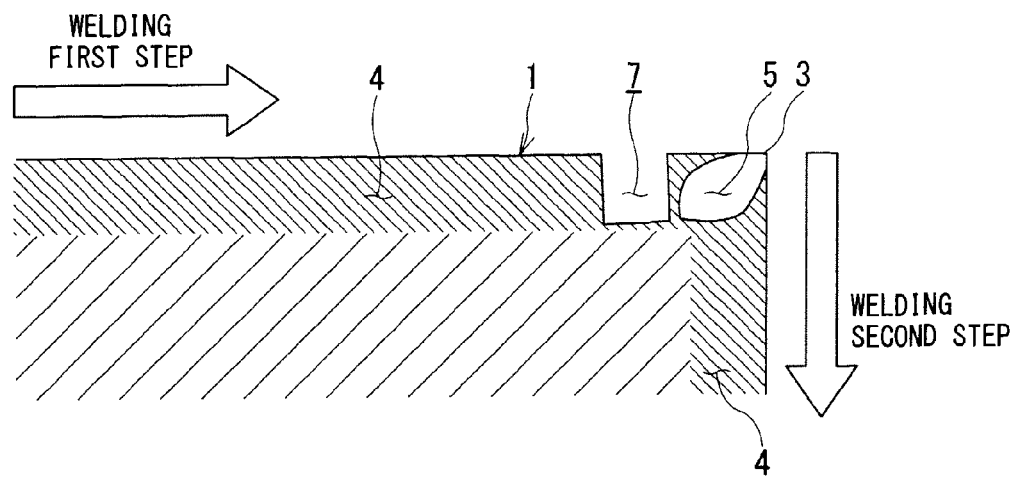
FIG. 2 is a partial sectional view after welding by the conventional friction stir welding in relation to FIG. 1.
Figure 3:
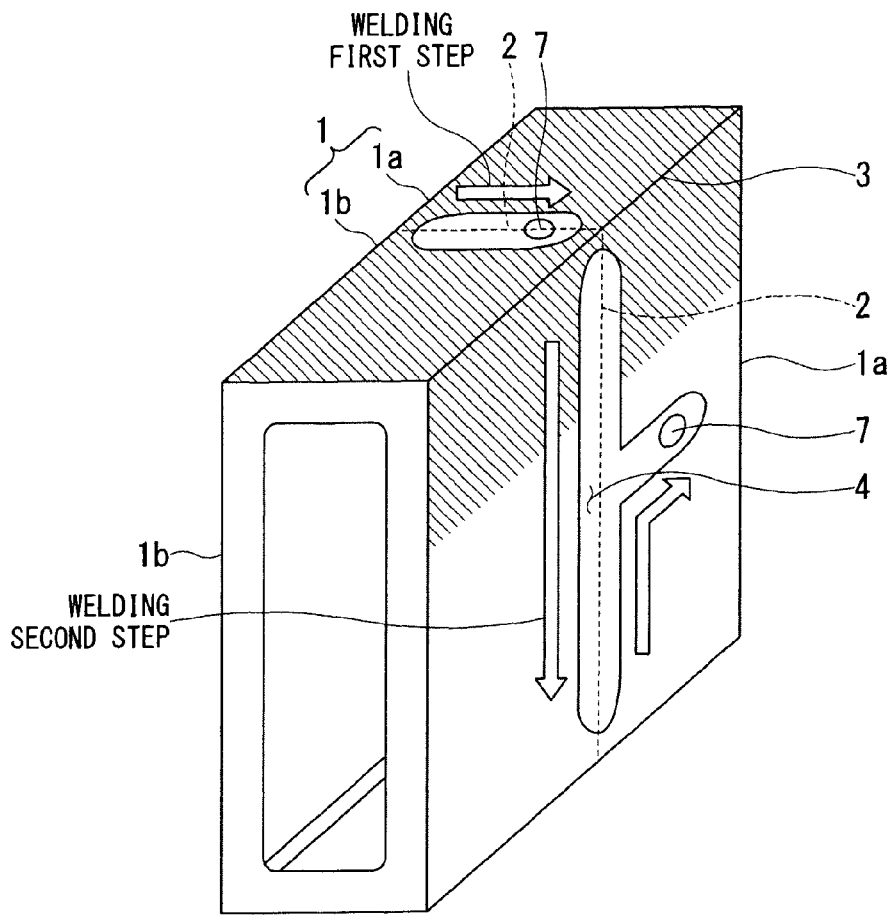
FIG. 3 is a perspective view illustrating an example of a joint structure in which complicated shape portions are butt-welded together by the friction stir welding.
Figure 4A:
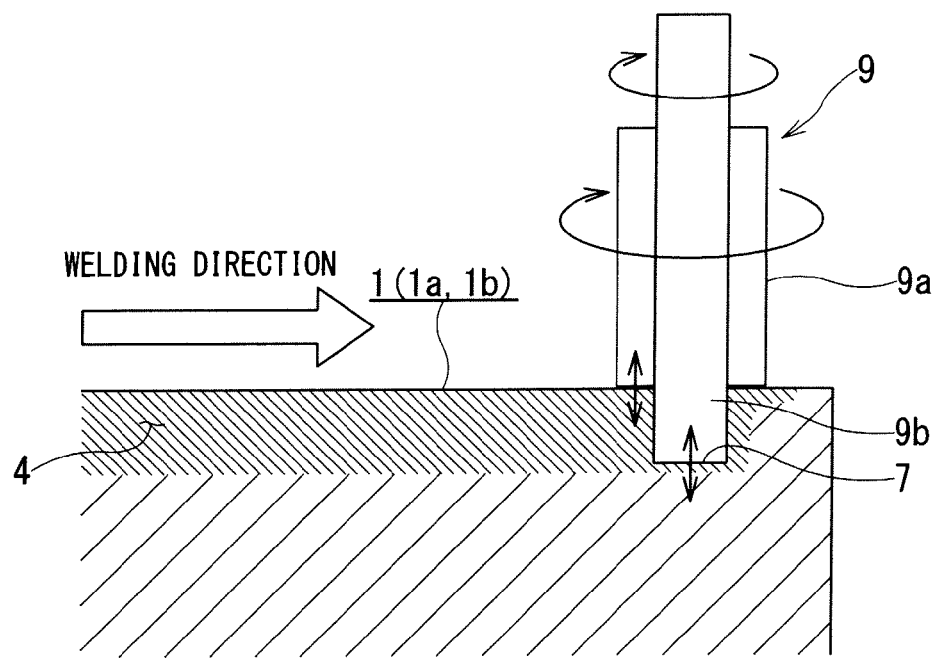
FIG. 4A is a sectional view illustrating members to be welded by a friction stir welding method using a conventional double-acting type friction stir welding apparatus.
Figure 4B:
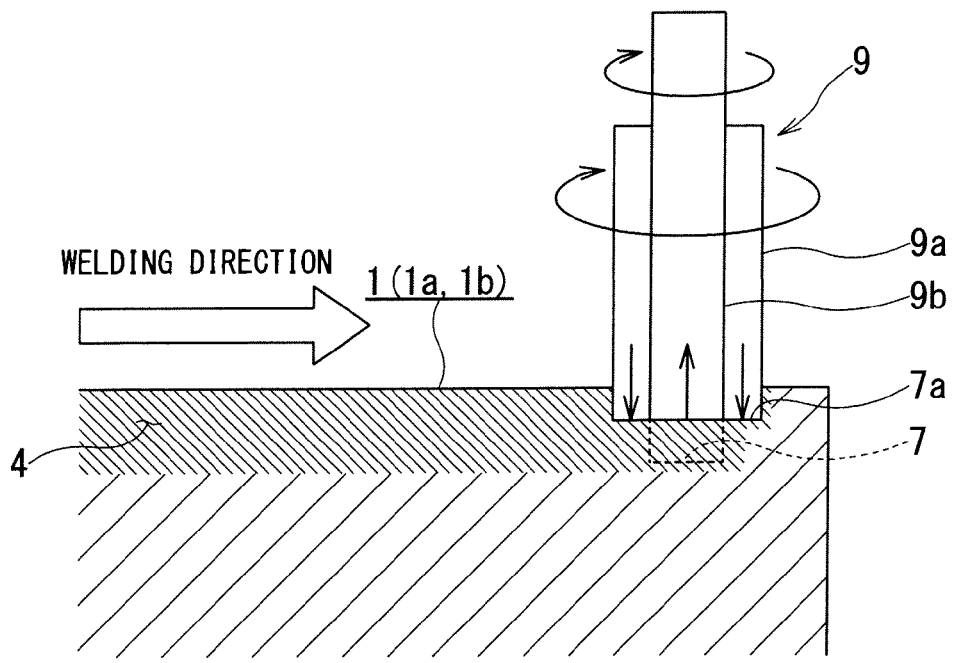
FIG. 4B is a plan view (viewed from upper side) illustrating members to be welded for explaining a probe hole filling step of the friction stir welding.
Figure 5A:
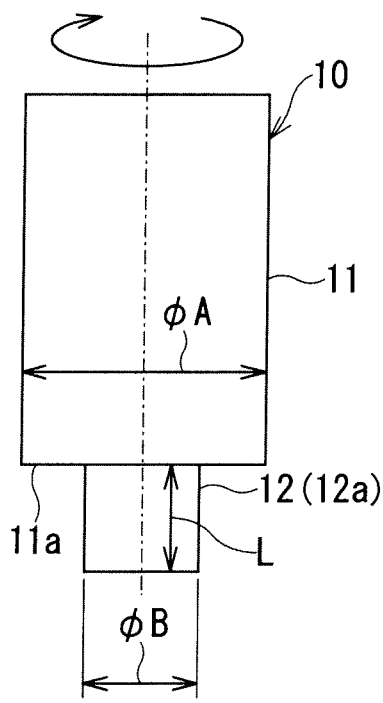
FIGS. 5A and 5B, illustrates tool shapes of a welding tool used in the friction stir welding (FSW)
Figure 5B:
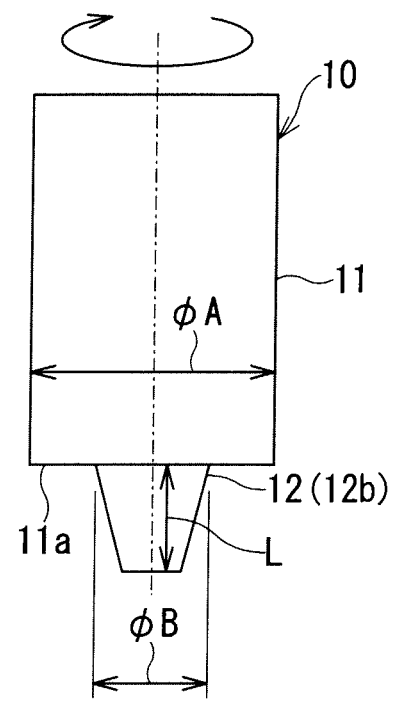

As shown in FIG. 5, the welding tool 10 is made of tool steel such as SKD61 having such tool dimensions as a shoulder diameter $\phi A$, a probe diameter $\phi B$ and a probe length L. The tool may have a structural shape provided with a cylindrical (columnar) probe 12a as shown in FIG. 5A, a structural shape provided with a conical probe 12b as shown in FIG. 5B or with other probe shapes.

Figure 6:
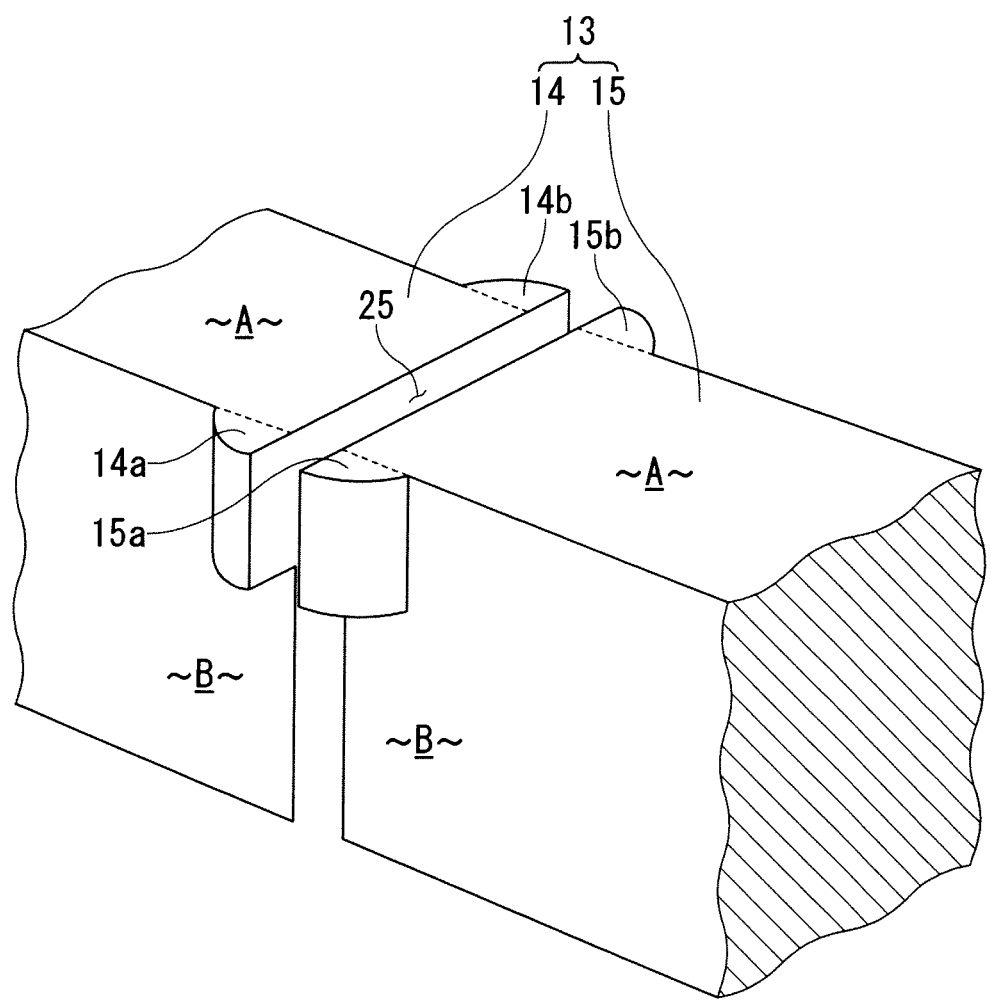
FIG. 6 is a perspective view illustrating a portion of a workpiece as one example of metal members to be welded used in the friction stir welding.

As shown in FIG. 6, a square member or a square tube member made of aluminum or aluminum alloy is used as metal members 13 to be butt-welded in the friction stir welding. For example, a pair of members to be welded 14 and 15, which are square members having an angular sectional shape, are used as the metal members 13.

Further, it is to be noted that the reference numerals 14 and 15 are shown as members to be welded 14 and 15 herein as members before the welding, the same reference numerals 14 and 15 may be similarly used after the welding to these members, such as for example, welded (weld) members 14 and 15 for the sake of preventing misunderstanding of members.

The friction stir welding is performed by stirring the pair of members to be welded 14 and 15 by use of the rotating welding tool 10 (FIG. 5), softening the members by frictional heat obtained by stirring and thereby plasticizing a material of the members to integrally join the members together. The friction stir welding is a technique for joining the members to be welded 14 and 15 in solid phase which are butted against each other by use of a plastic flow phenomenon occurring in conjunction with the rotation of the welding tool 10.

In the metal members 13, excess thickness portions 14a and 14b; 15a and 15b are provided as weld tabs at opposing edge portions of the pair of members to be welded 14 and 15 to be butted and welded together. The excess thickness portions 14a and 14b; 15a and 15b are in contact with the complicated shape portions, e.g., angular portions of the members to be welded 14 and 15 and laterally protrude (extend or project) therefrom. The excess thickness portions 14a and 14b; 15a and 15b also protrude so as to be flush with a weld portion upper surface and a weld surface as shown in FIG. 6. The excess thickness portions 14a and 14b; 15a and 15b protrude laterally outward as extensions of a weld-start edge portion and a weld-end edge portion on one side (one surface), e.g., an upper side out of four sides (four surfaces) around each of butt surfaces of the members to be welded 14 and 15.

In the present invention, the friction stir welding is performed by longitudinally butting the metal members 13 with the complicated shape portions, such as an angular shape, a stepped shape, or a small round shape with a radius of about 20 mm or less, as a sectional shape at butt end portions. A plurality of welding steps and filling steps are combined together to perform the friction stir welding. Since the plurality of welding steps and filling steps are combined together to perform the friction stir welding, weld portions can be efficiently and effectively welded together by use of the plastic flow of the material caused in conjunction with the friction stir welding.

The present invention provides a friction stir welding method for a metal material and a friction stir welded body manufactured thereby capable of improving weld strength (mechanical and physical strength) and rigidity of the buttweld portions and also improving weld quality while reliably preventing a probe hole and an unwelded portion from remaining in the complicated shape portion and a region in the vicinity thereof.

First Embodiment

FIGS. 6 to 14

A first embodiment in which metal members with complicated shape portions are friction-stir-welded together will be described with reference to FIGS. 6 to 14.

Figure 7:
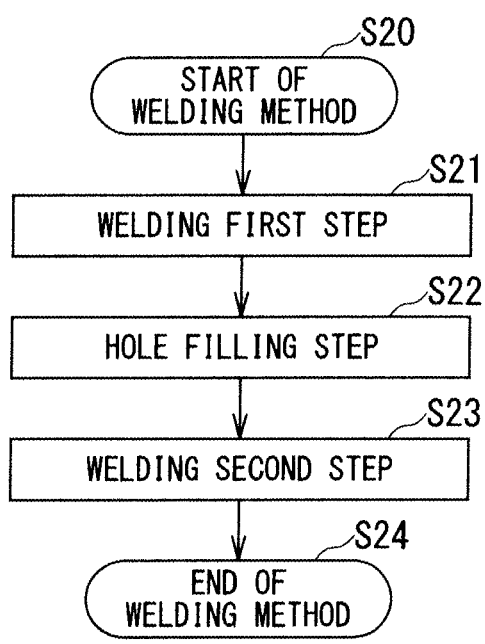
FIG. 7 is a flowchart representing basic manufacturing steps for performing friction stir welding according to a first embodiment of the present invention.

FIG. 7 is a flowchart explaining basic steps in the first embodiment for performing the friction stir welding to a metal material. In the friction stir welding performed to a metal material, the welding tool 10 shown in FIG. 5, which is a joining tool, and the metal members 13 shown in FIG. 6, which are square members or square tube members, are prepared in a preparation step. Respective steps of the friction stir welding are then started (step: S20 (START OF WELDING METHOD)).

Further, herein, the friction stir welding will be described by using an example in which stress is concentrated on a member upper surface A of the members to be welded 14 and 15, and the members to be welded 14 and 15 are butt-welded together in the longitudinal direction thereof as shown in FIG. 6.

In the flowchart in FIG. 7, when the friction stir welding is started, three basic steps, including a welding first step (S21), a filling step (S22), and a welding second step (S23), are sequentially performed to thereby produce or provide a metal material welded body. The friction stir welding is then ended (step: S24 (END OF WELDING METHOD)).

In the welding first step S21, the welding tool 10 is inserted, while being rotated, between weld surfaces 25 from the excess thickness portions 14a and 15a on one side, i.e., the weld-start edge portions of the butted members to be welded 14 and 15 of the metal members 13 in FIG. 6. The shoulder surface 11a of the shoulder portion 11 of the welding tool 10 is pressed against the member upper surface A. The members to be welded 14 and 15 are thereby stirred, and softened by frictional heat. The members to be welded 14 and 15 are maintained in solid phase state to encourage the plastic flow of the material.

The probe portion 12 (12a or 12b) is inserted between the weld portions (the butt surfaces) 25 of the members to be welded 14 and 15 while the welding tool 10 is being rotated so as to soften the members to be welded 14 and 15 by frictional heat and maintain the members to be welded 14 and 15 in solid phase state to encourage the plastic flow of the material. The members to be welded 14 and 15 are thereby welded together.

Figure 8A:
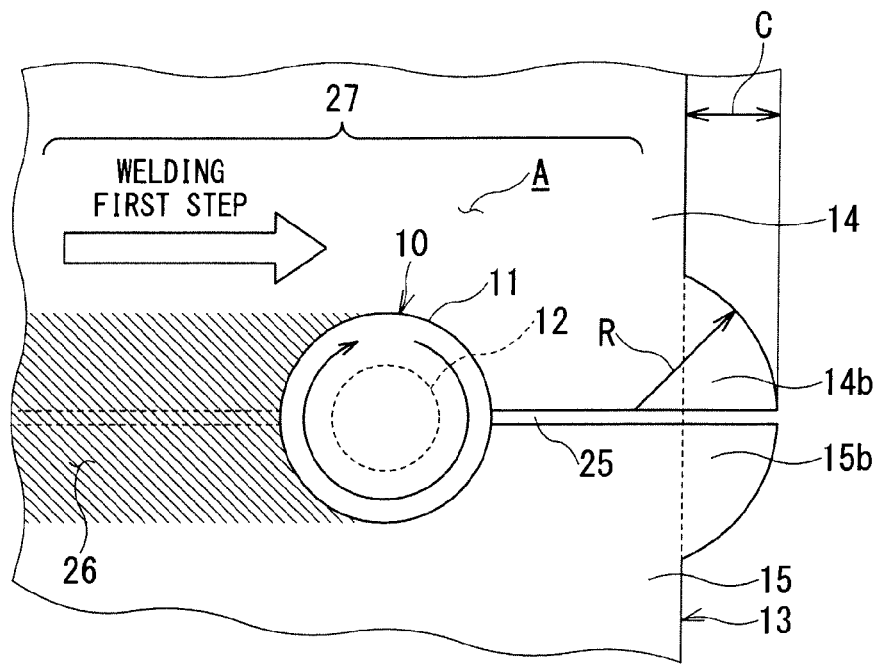

Furthermore, as shown in FIG. 8A, the welding tool 10 is, while being rotated, moved to the weld-end edge portions as the excess thickness portions 14b and 15b on an opposite side along the weld portions 25 of the members to be welded 14 and 15, and a movement locus thereof is formed as a friction stir welded portion 26.

In the welding first step 21, the welding tool 10 stops at the weld-end edge portions immediately before the excess thickness portions 14b and 15b that are extended along the upper surface A of the weld portion 25 in the friction stir welding between the members to be welded 14 and 15. The welding first step 21 is thereby ended (terminated). The excess thickness portions 14a and 14b; 15a and 15b are provided outside of a product portion 27 that constitutes a metal material welded body (workpiece).

Figure 8B:
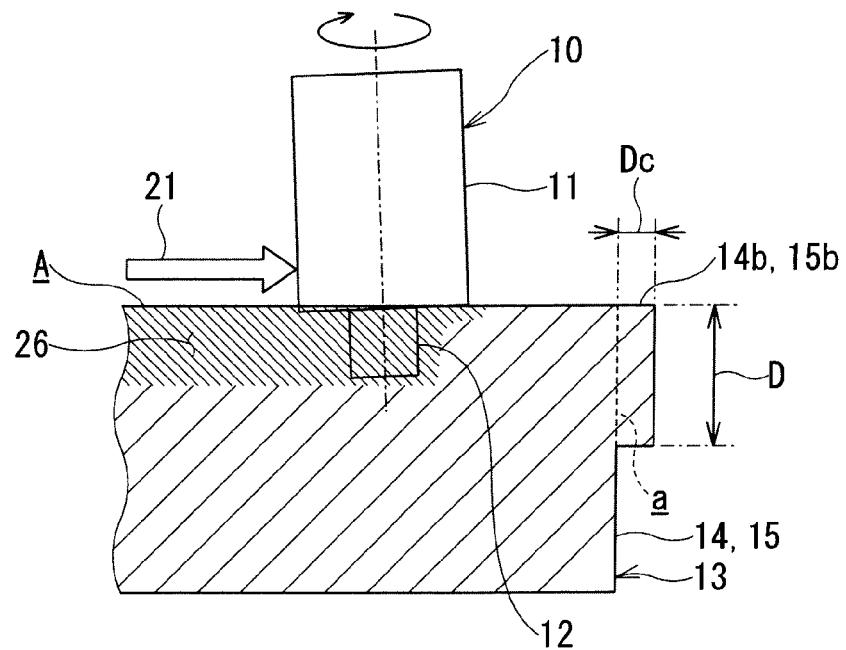

Since the probe portion 12 of the welding tool 10 moves within the product portion 27 from the weld-start edge portions to the weld-end edge portions in the welding first step 21, the product portion 27 mostly receives load or rotational force from the welding tool 10. Accordingly, it is required for the excess thickness portions 14a and 14b; 15a and 15b to be small, and hence, the excess thickness portions are only slightly deformed, Each of the excess thickness portions 14b and 15b is formed in, for example, a semi-columnar shape having an excess thickness portion length C, an excess thickness portion depth (height) D, and a radius R as shown in FIGS. 8A and 8B. A relationship between the dimensional shapes of the excess thickness portions 14b, 15b and the dimensional shape of the welding tool 10 satisfies the following "Expression 1".

Excess thickness portion length $C > A - B/2$

Excess thickness portion depth $D \geq A$

Radius $R \geq A/2$     [Expression 1]

The excess thickness portions 14a and 15a on the weld-start edge side of the metal members 13 have the same shape as the excess thickness portions 14b and 15b on the weld-end edge side.

Figure 9:
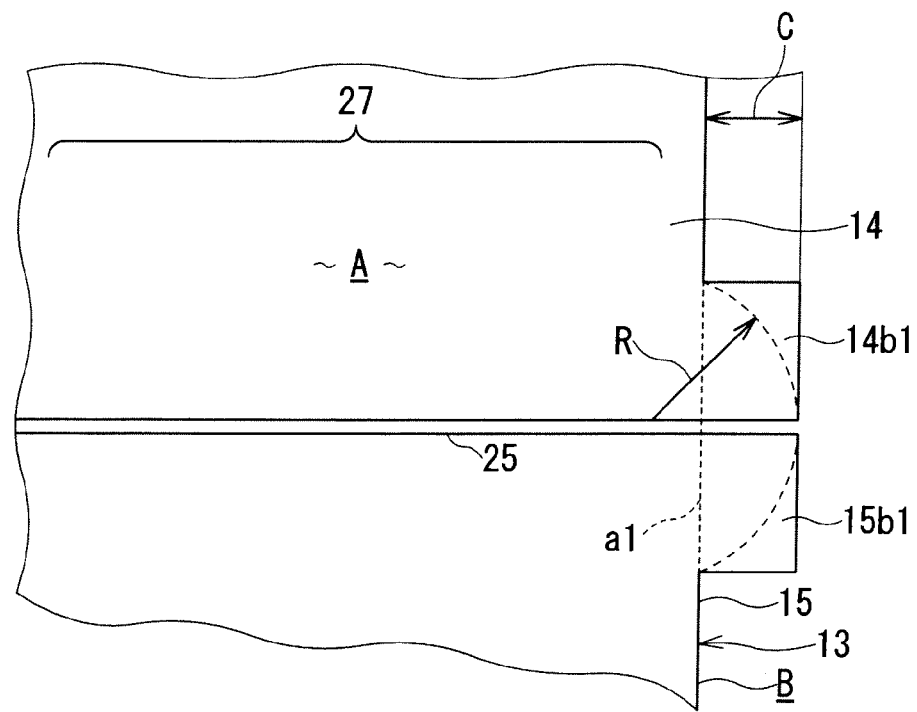
FIG. 9 is an upper side view of a member as workpiece to be welded according to a first modification of the first embodiment.
Figure 10:
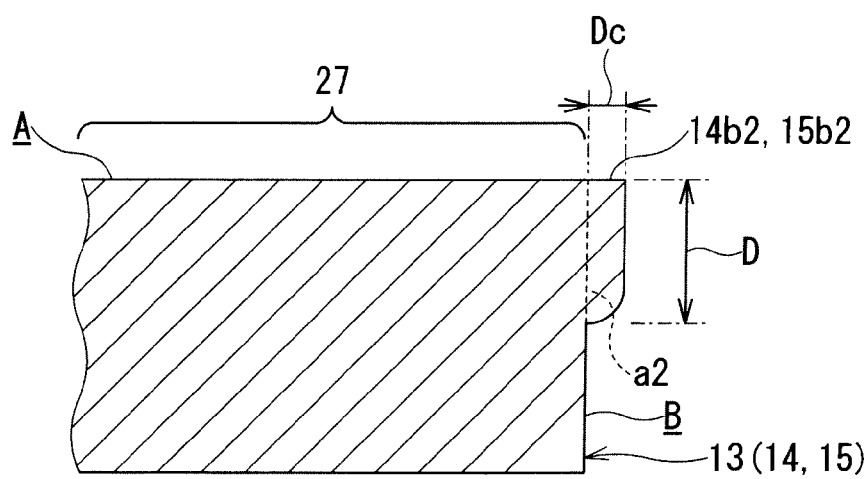
FIG. 10 is a partial sectional view of a workpiece to be welded according to a second modification in the first embodiment.

Although the example, in which the excess thickness portions of the metal members 13 are formed in a semi-columnar shape, is shown in FIGS. 8A and 8B, modified examples of the excess thickness portions may be formed in a shape as shown in FIGS. 9 and 10. In a first modification shown in FIG. 9, excess thickness portions 14b1 and 15b1 of the metal members 13 (14 and 15) are formed in a rectangular shape. In a second modification shown in FIG. 10, excess thickness portions 14b2 and 15b2 of the metal members 13 (14 and 15) have their lower portions formed in a rounded R shape.

In any case, the excess thickness portions of the metal members 13 are cut along dashed lines a, a1, and a2 by machining operation, such as cutting, after the completion of the respective steps of the friction stir welding, and in such case, since the excess thickness portions are small, the excess thickness portions are easily cut (removed) after the welding.

Figure 11A:
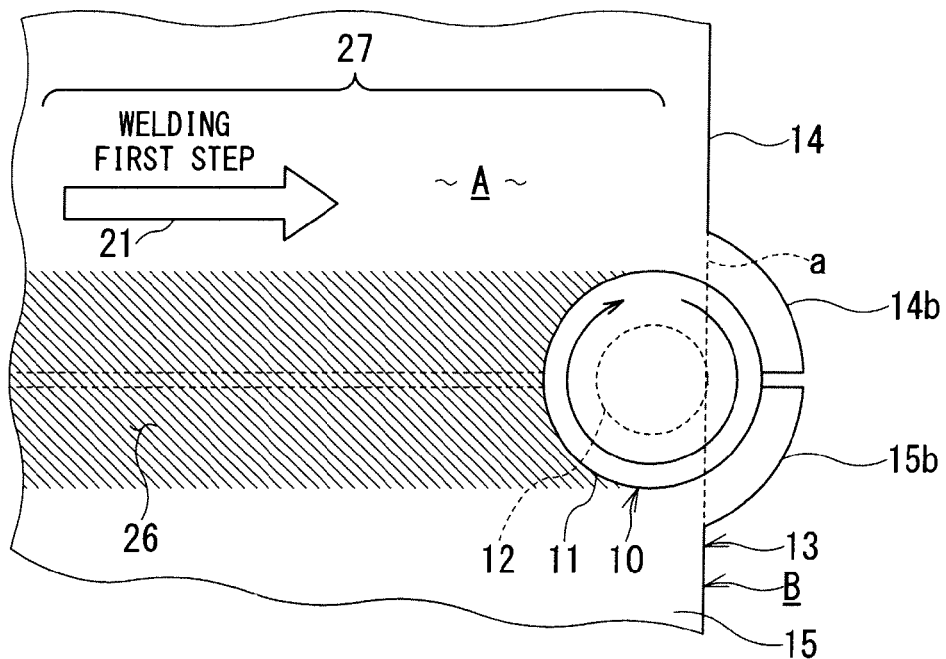
Figure 11B:
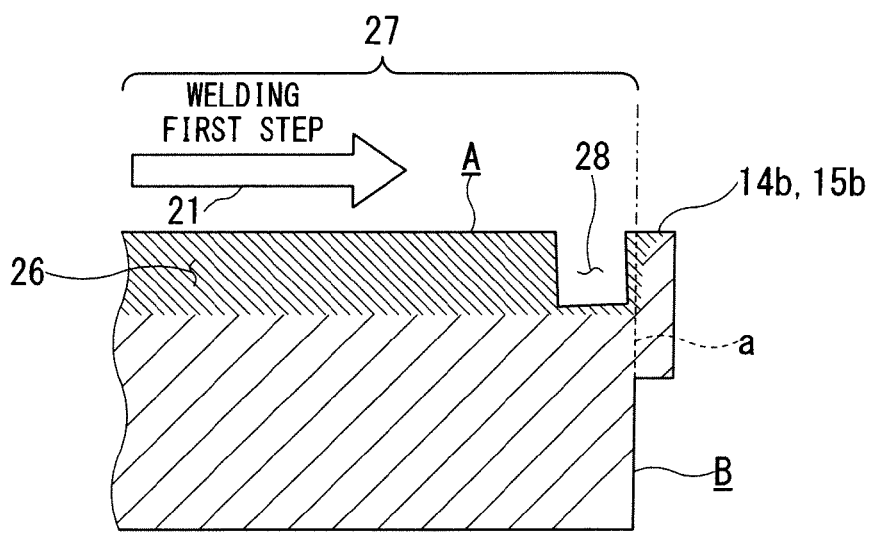

The members to be welded 14 and 15 of the metal members 13 are welded together at the welded portion 26 at the upper surface (member upper surface) A by the friction stir welding in the welding first step 21 as shown in FIG. 11A. The welding first step 21 is terminated at the weld-end edge portions before the excess thickness portions 14b and 15b as being an end point. As shown in FIG. 11B, the welding first step 21 is terminated at a position where a front end in a traveling direction of the probe portion 12 of the welding tool 10 is adjacent to a border between the excess thickness portions 14b, 15b and the product portion 27.

The welding tool 10 is pulled out of the weld portions 25 of the members to be welded 14 and 15 at the weld-end position. A probe hole 28 is thereby formed by the welding tool 10 and remains in the member upper surface A at a position close to the excess thickness portions 14b and 15b of the members to be welded 14 and 15.

Since the welding first step 21 is terminated at the weld-end edge (point) portions shown in FIGS. 11A and 11B, the probe hole 28 is located closer to the excess thickness portions 14b and 15b. The probe hole is thereby easily filled by utilizing the nature of the plastic flow in the following filling step 22. When the welding first step 21 is terminated at the weld-end edge portion close to the excess thickness portions 14b and 15b, the load and the rotational force generated in the friction stir welding are mostly received by the product portion 27. Thus, even if the excess thickness portions 14b and 15b are small, the excess thickness portions 14b and 15b are only slightly deformed (opened), so that the occurrence of defects due to the deformation (opening) can be prevented.

After the members to be welded 14 and 15 are welded together along the member upper surface A in the welding first step 21, the welding tool 10 moves to perform the filling step 22 to thereby fill the probe hole 28 in the member upper surface A. In place of the same tool as that used in the welding first step 21, a new separate welding tool may be used as the welding tool 10. In this case, the depth D of the excess thickness portion is preferably equal to or more than the shoulder diameter A of the tool when the welding tool is used in the filling step 22.

Figure 12:
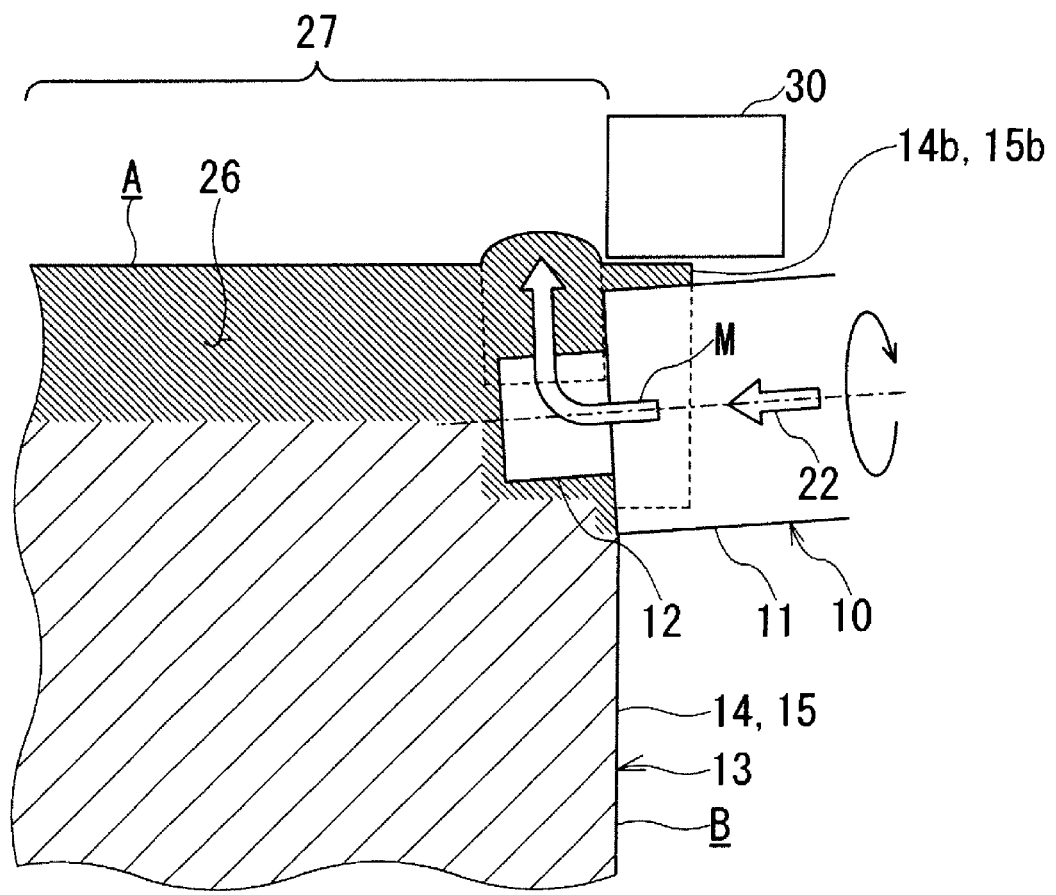
FIG. 12 is a sectional view of the members to be welded illustrating a filling step of the friction stir welding in the first embodiment.
Figure 13:
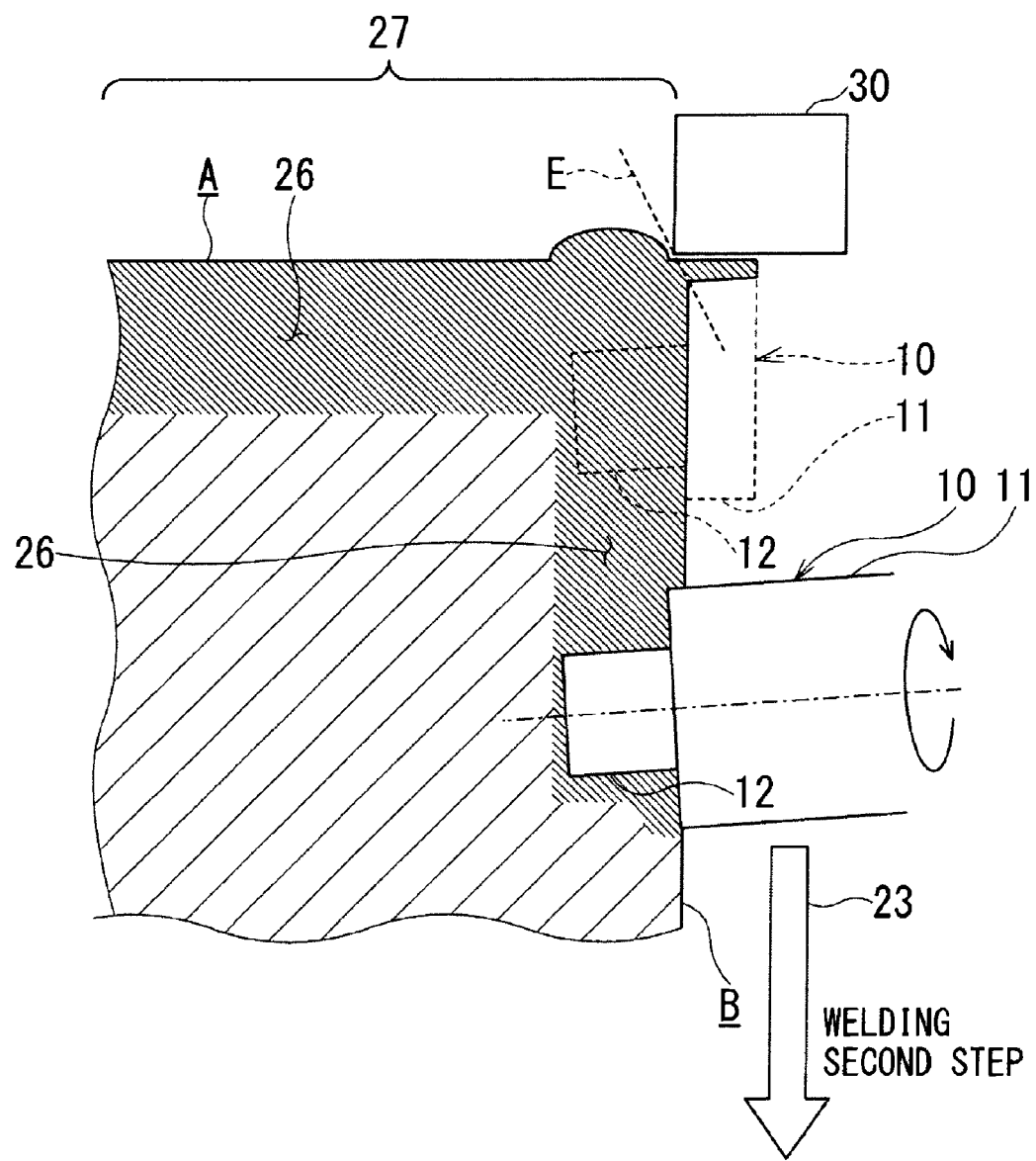
FIG. 13 is a sectional view of the members to be welded illustrating a welding second step of the friction stir welding in the first embodiment.

In the filling step 22, the welding tool 10 is inserted, while being rotated, into a member side surface B, on which the excess thickness portions 14b and 15b are provided, from an external direction at substantially a right angle as shown in FIG. 12.

The excess thickness portions 14b and 15b are pressed by a press jig 30 in advance before the welding tool 10 is inserted, and hence, the deformation of the excess thickness portions 14b and 15b in the upward direction can be suppressed.

When the welding tool 10 is inserted, while being rotated, into the member side surface B from the excess thickness portions 14b and 15b in the filling step 22, the probe portion 12 softens the material of the members to be welded 14 and 15 to thereby cause the material to plastically flow in a direction as indicated by an arrow M (FIG. 12) in which the material is pushed into the probe hole 28. That is, by inserting the welding tool 10, a portion of the material of the excess thickness portions 14a and 14b, 15a and 15b pressed by the shoulder portion 11 as well as the material of the members to be welded 14 and 15 around the inserted probe portion 12 plastically flows into the probe hole 28 in the member upper surface A as indicated by the arrow M. Thus, the probe hole 28 can be filled.

The press jig 30 presses the upper surface side of the excess thickness portions 14b and 15b to suppress the flow of the material. Accordingly, the material is prevented from flowing into areas other than the probe hole 28 in the member upper surface A.

The welding second step 23 is performed subsequent to the filling step 22. In the welding second step 23, the welding tool 10 remains, while being rotated, within the member side surface B and is moved parallel to the member side surface B, along which the members to be welded 14 and 15 are welded together. The friction stir welded portion 26 is extended along the member side surface B of the members to be welded 14 and 15 by moving the welding tool 10.

The members to be welded 14 and 15 of the metal members 13 are longitudinally welded together with the friction stir welded portion 26 which is formed throughout the member upper surface A and the member side surface B by performing the welding second step 23 after the welding first step 21 and the filling step 22. The members to be welded 14 and 15 can be welded together without the probe hole 28 and the unwelded portion in the vicinity of the complicated shape portions where the excess thickness portions 14b and 15b are provided, i.e., in the vicinity of the angular portions. Consequently, the weld strength of the butt welding is improved, and favorable weld quality is obtained.

After the termination of the friction stir welding in which the members to be welded 14 and 15 are longitudinally butt-welded together as welded portions 14 and 15, the remaining excess thickness portions 14a and 14b, 15a and 15b are removed from the metal members 13 by machining operation such as grinding and cutting as indicated by a dash line E. Since the probe hole and the unwelded portion do not exist in the vicinity of the complicated shape portions (the angular portions) in the metal material welded body obtained by butt-welding the members 14 and 15, the favorable appearance quality is obtainable, and the mechanical and physical strength can be improved.

The friction stir welding according to the first embodiment is a solid-phase joining technique for softening the metal members as the members to be welded 14 and 15 with the complicated shape portions by the rotational friction of the welding tool 10, thereby plasticizing the members. Therefore, a joint structure of the welded body obtained by the butt welding has less weld defects caused by thermal deformation or oxidation in the welding. Moreover, the members to be welded 14 and 15 are favorably welded together without the probe hole 28 and the unwelded portion in the member upper surface in the vicinity of the complicated shape portions, so that the weld strength is improved, and the favorable weld quality (appearance quality) can be obtained.

The probe hole 28 remaining in the weld-end edge portions on the member upper surface A as one side portion according to the execution of the friction stir welding in the welding first step 21 can be filled by the plastic flow of the material in the following filling step 22, in which the welding is started from the excess thickness portions 14b and 15b. Accordingly, the appearance quality of the friction stir welded body obtained by the butt welding in the friction stir welding process in the first embodiment can be improved, thus obtaining the product having favorable quality.

[First Modification of Filling Step]

Figure 14A:
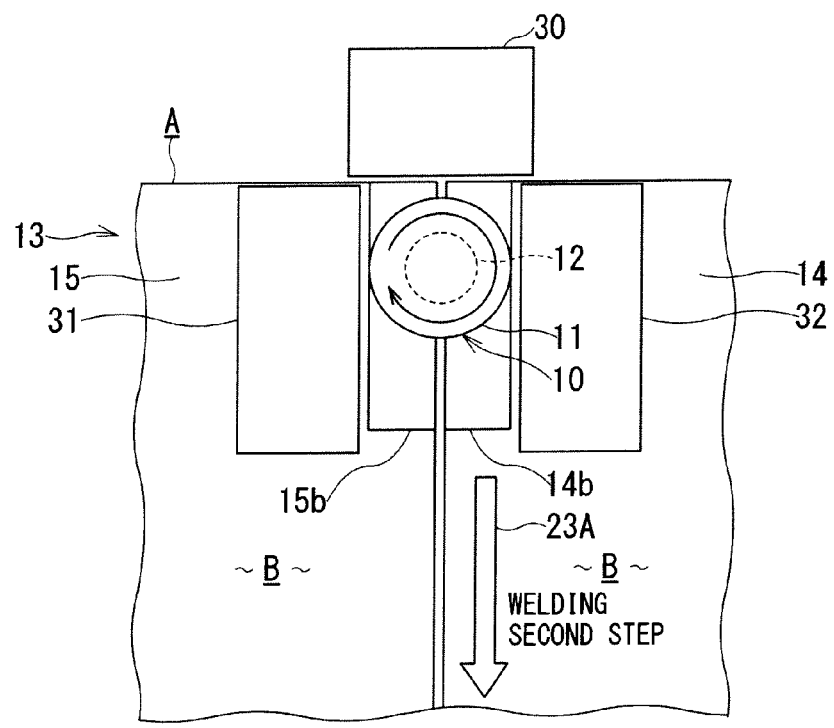
Figure 14B:
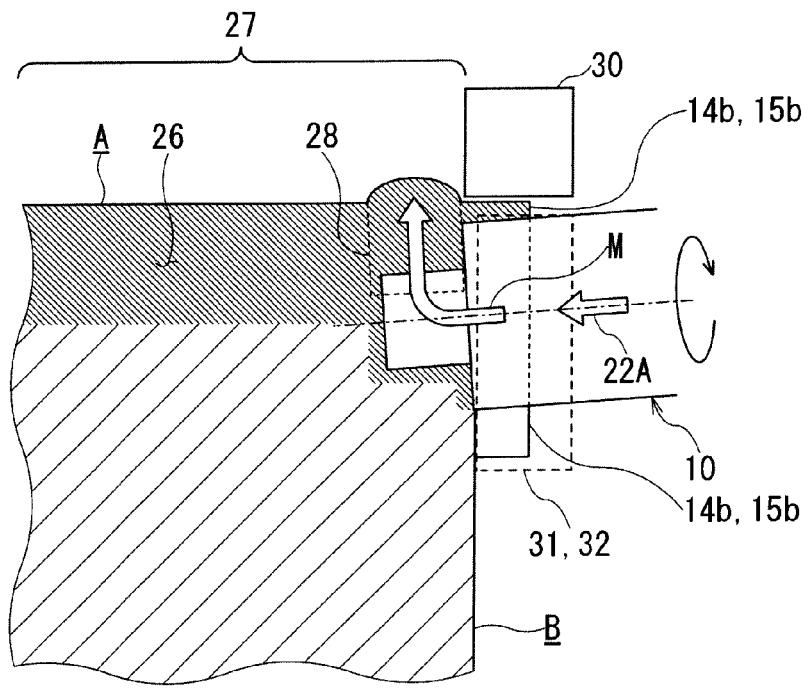

A first modification 22A, i.e., modified example, of the filling step 22 for filling the probe hole will be explained with reference to FIGS. 14A and 14B. Further, members having the same configuration as that of the members used in the filling step 22 shown in FIG. 12 are added with the same reference numerals and overlapped description is omitted herein.

In the filling step 22A in the first modification, deformation restraint jigs 31 and 32 are arranged on both sides of the excess thickness portions 14b and 15b of the members to be welded 14 and 15 in addition to the press jig 30. By arranging the press jig 30 and the deformation restraint jigs 31 and 32, the material of the members to be welded 14 and 15, and the excess thickness portions 14b and 15b can be more effectively prevented from flowing into areas other than the probe hole 28 in the filling step 22A. The material is more effectively caused to plastically flow in the direction of the arrow M to fill the probe hole 28. The weld strength between the members 14 and 15 (weld members 14 and 15) with the complicated shape portions can be further improved.

Second Embodiment

Figure 15:
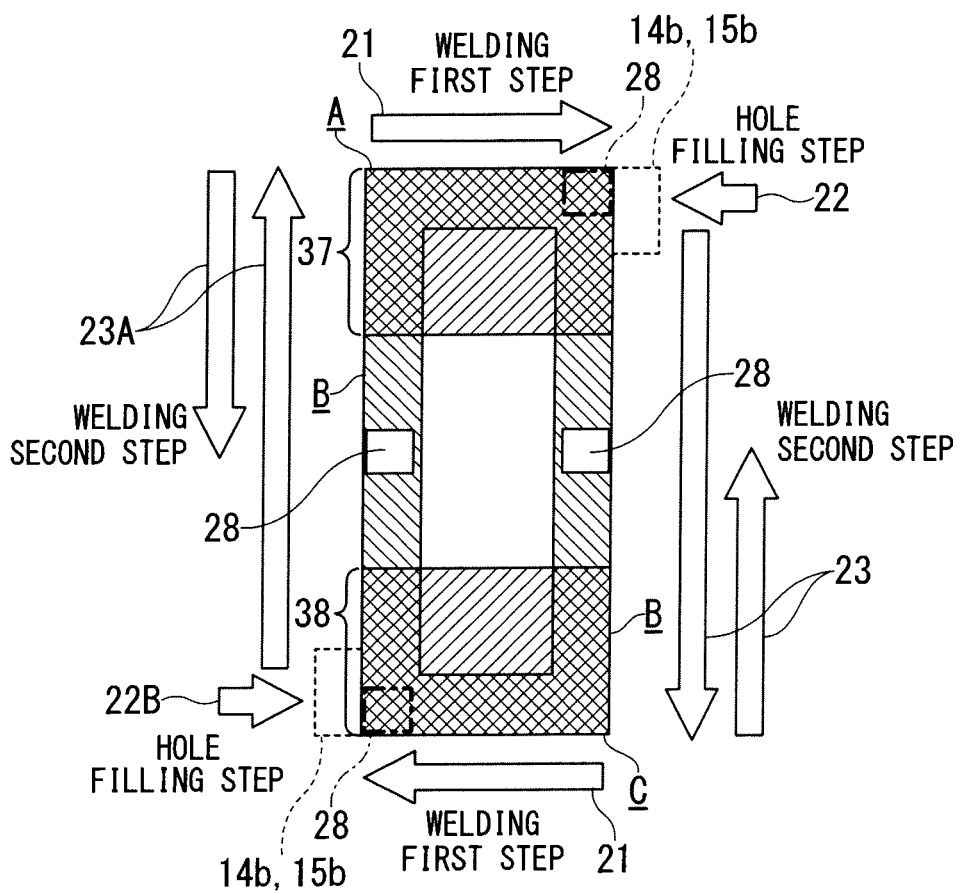
FIG. 15 is an illustration representing a structure for the friction stir welding according to a second embodiment of the present invention.
Figure 16:
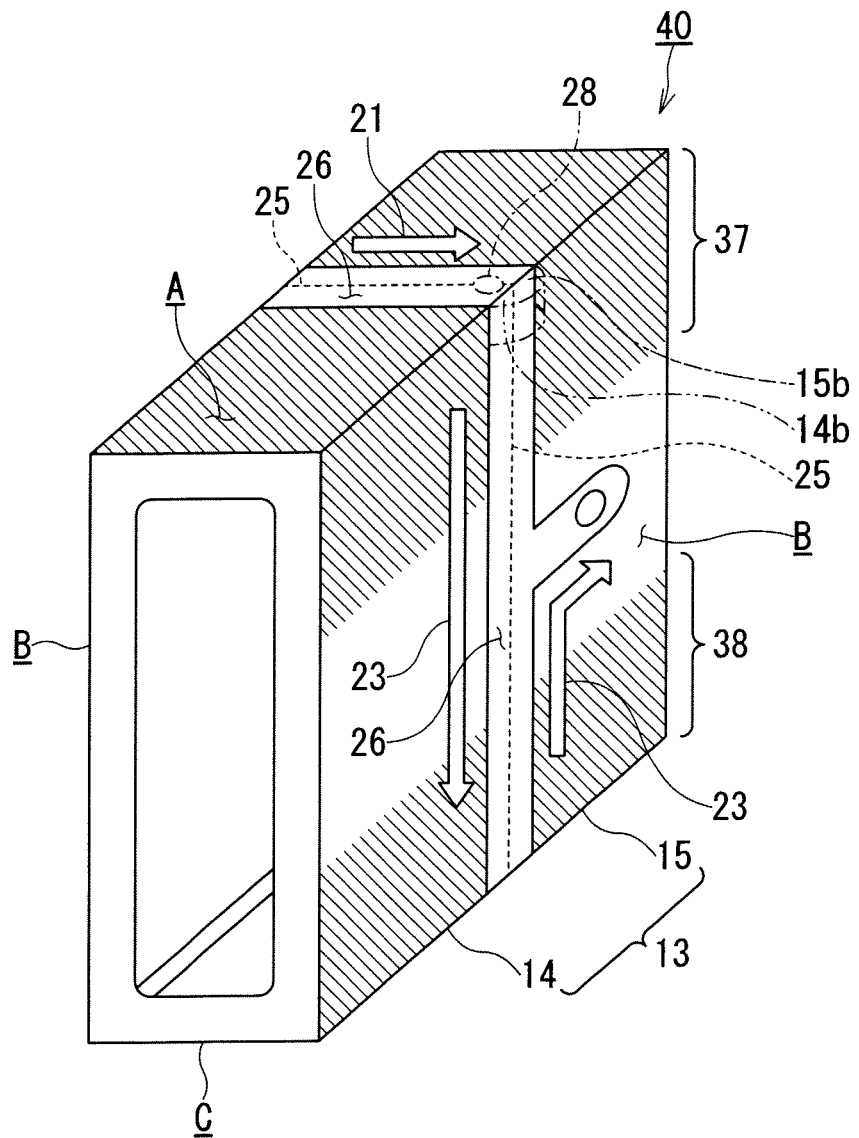
FIG. 16 is a perspective view illustrating an outer configuration of a welded body made of metal and manufactured by applying the second embodiment.

FIGS. 15 and 16

A second embodiment of the preset invention will be described with reference to FIGS. 15 and 16.

The second embodiment represents an example of a joint structure in which the members to be welded 14 and 15 of the metal members 13 with rectangular sections in which stress is concentrated on the member upper surface A and a member lower surface C are butt-welded together.

In order to perform the friction stir welding along four surfaces of the rectangular section, the friction stir welding processes in the first embodiment is performed separately in two sets of steps. Members having the same configuration as those in the first embodiment are added with the same reference numerals to thereby omit the overlapping description herein.

In the second embodiment shown in FIG. 15, stress concentration portions 37 and 38 are provided at the member upper surface A and the member lower surface C. In the second embodiment, a first set of friction stir welding for the first half process (welding for first half periphery) is performed from the member upper surface A to one of the member side surfaces B. A second set of friction stir welding for the second half process (welding for second half periphery) is subsequently performed from the member lower surface C to the other of the member side surfaces B. Accordingly, the members to be welded 14 and 15 with the rectangular sections are butt-welded together in the longitudinal direction over the entire periphery by the two sets of friction stir welding (first half and second half processes).

The members to be welded 14 and 15 are respectively provided, as appropriate, with the excess thickness portions 14b and 15b that protrude as extensions of the weld-end edge portions on four side surfaces to be butted.

More specifically, in the friction stir welding according to the second embodiment shown in FIG. 15, the butt welding for the first half periphery is completed by performing: the welding first step 21 of welding the butt surfaces of the members to be welded 14 and 15 along the member upper surface A as one surface side by the welding tool 10 and terminating the butt welding along the one side surface immediately before the excess thickness portions 14b and 15b; the filling step 22 of inserting the welding tool 10 from the excess thickness portions 14b and 15b to cause the plastic flow of the material subsequent to the butt welding along the member upper surface A (the one side surface) and filling the probe hole 28 remaining after the welding first step 21; and the welding second step 23 on the member side surface B of performing butt welding, continuously from the filling step 22, along one of the member side surface B as a lateral side leading from the previous member upper surface A.

Further, in the welding second step 23, the welding is terminated in the vicinity of a center portion of the member side surface B by reversing a weld direction after the welding performed downwardly along the member side surface B, thereby turning back the welding tool 10.

The friction stir welding for the remaining half periphery from the member lower surface C to the other of the member side surfaces B is completed by performing: the welding first step 21 on the other side surface (the member lower surface) of welding the butt surfaces of the members to be welded 14 and 15 along the other side surface opposite to the previous one side surface, i.e., the member lower surface C after the termination of the welding second step 23 on the member side surface, and terminating the butt welding along the other side surface immediately before the next excess thickness portions 14b and 15b; an another-side filling step 22B of inserting the welding tool 10 from the next excess thickness portions 14b and 15b to cause the plastic flow of the material subsequent to the butt welding along the other side surface, thereby filling the probe hole 28 remaining after the welding first step 21 on the other side; and a second welding second step 23A of performing butt welding, continuously from the other-side filling step 22B, along the other side surface of the member side surfaces B (other lateral side) leading from the other side surface.

In the welding second step 23A, the welding is terminated in the vicinity of a center portion of the other of the member side surfaces B by reversing a weld direction after the welding performed upwardly along the other of the member side surfaces B, thereby turning back the welding tool 10. The excess thickness portions are removed by machining after the termination of the friction stir welding. In the welding second step 23 and the second welding second step 23A, the butt welding along the member side surface B may be terminated at the lateral side center portion by stopping the welding tool 10 in mid-course thereof.

In the friction stir welding according to the second embodiment, since the welding operation is terminated at the center portion of the member side surface B in the respective welding second steps 23 and 23A, the probe hole 28 of the welding tool 10 remains finally. However, the probe hole 28 remains only in the vicinity of the center portion of the member side surface B, to which less stress is applied, and the probe hole or the unwelded portion does not remain in the stress concentration portions 37 and 38 at the member upper surface A and the member lower surface C after the friction stir welding over the entire periphery.

Therefore, in the metal material welded body 40 with the rectangular section obtained by butt-welding the members to be welded by the friction stir welding process according to the second embodiment, the probe hole and the unwelded portion do not exist in the stress concentration portions 37 and 38, thus obtaining the high weld strength. Furthermore, since the probe hole and the unwelded portion do not remain in the stress concentration portions of the metal material welded body 40, the joint structure which can improve the mechanical and physical strength and achieve the favorable weld appearance can be provided.

Third Embodiment

Figure 17:
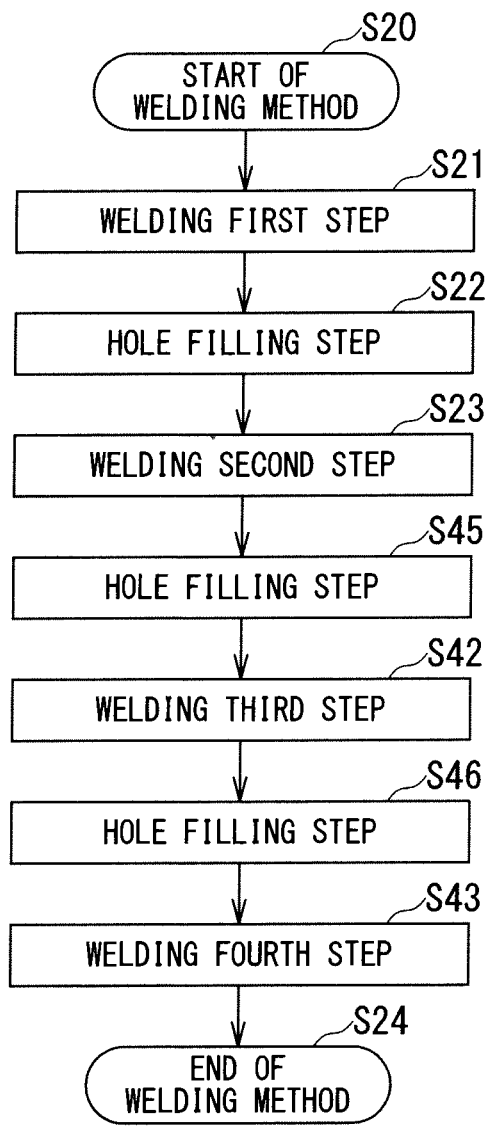
FIG. 17 is a flowchart representing steps of performing friction stir welding process according to a third embodiment of the present invention.
Figure 18:
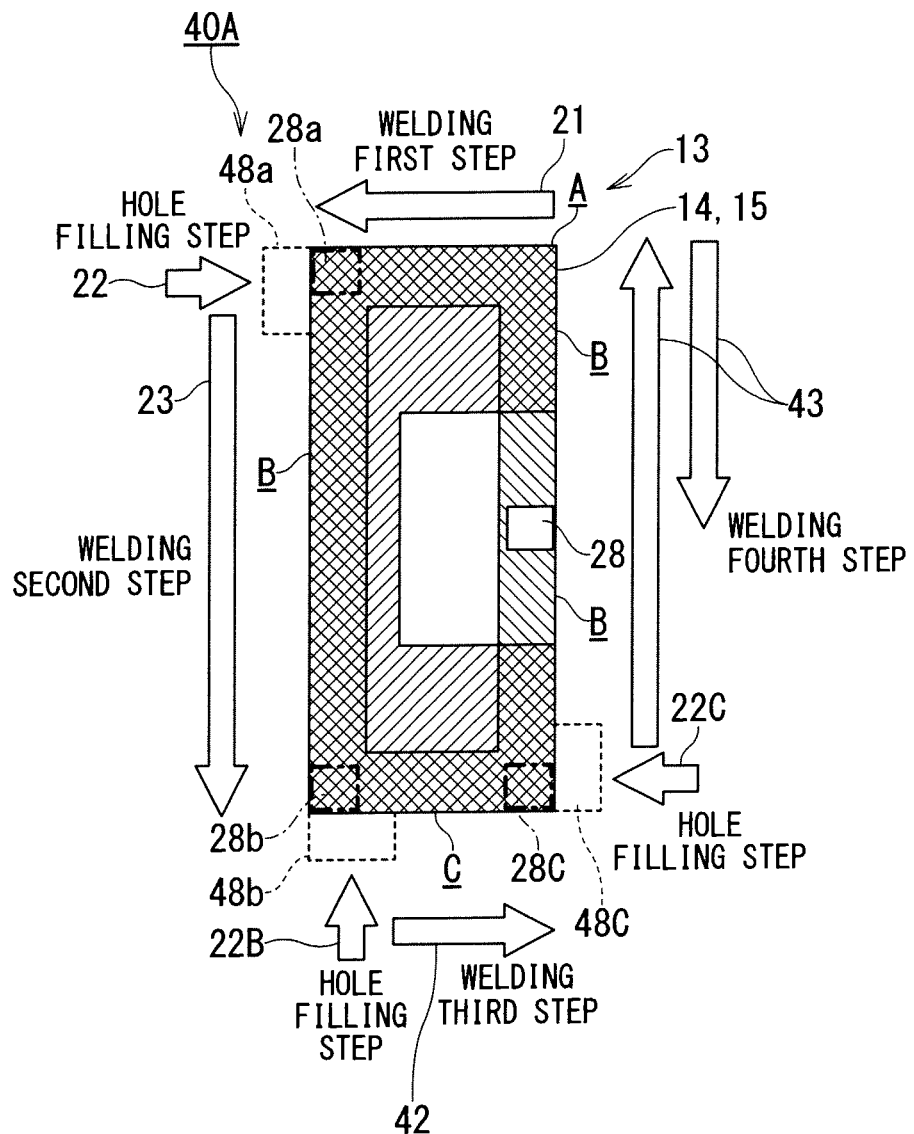
FIG. 18 is an illustration representing a structure for the friction stir welding according to the third embodiment of the present invention.

FIGS. 17 and 18

A third embodiment of the present invention will be described hereunder with reference to FIGS. 17 and 18.

The third embodiment represents an example of a joint structure in which the members to be welded 14 and 15 of the metal members 13 with rectangular sections at which stress is concentrated on three surfaces out of four surfaces of a member are butt-welded.

In the joint structure example, the friction stir welding is performed in a clockwise or counterclockwise direction from a surface adjacent to the remaining surface at which no stress is concentrated, e.g., from the upper surface A of the member. Further, the same reference numerals are added to members corresponding to those in the first embodiment, and repeated explanation or like are omitted herein.

More specifically, when the members to be welded 14 and 15 of the metal members 13 with the rectangular sections are butt-welded in the friction stir welding, the welding first step (S21), the welding second step (S23), a welding third step (S42), and a welding fourth step (S43) are performed sequentially from the surface adjacent to the surface where no stress is concentrated, e.g., from the member upper surface A as shown in FIGS. 17 and 18. Filling steps (hole filling steps) (S22, S45 and S46) are also performed respectively between the welding first step S21 and the welding second step S23, between the welding second step S23 and the welding third step S42, and between the welding third step S42 and the welding fourth step S43 so as to thereby fill probe holes 28a, 28b and 28c remaining by performing the welding first step 21, the welding second step S23, and the welding third step S42.

In the respective filling steps S22, S45 and S46, the probe holes 28a, 28b and 28c remaining after the previous welding steps are filled according to the plastic flow of the material by inserting the welding tool 10 from excess thickness portions 48a, 48b and 48c.

In the last welding fourth step 43 of the friction stir welding, the welding is performed upwardly from the lower side along the member side surface B as shown in FIG. 18. The welding is terminated in the vicinity of a center portion of the member side surface B by reversing a welding direction at a position close to the member upper surface A, thereby turning back the welding tool 10. The probe hole 28 remains eventually after the termination of the welding in the welding fourth step S43.

Since the probe hole 28 is formed in the member side surface B where no stress is concentrated, adverse effects on the weld strength can be prevented. The excess thickness portions 48a, 48b and 48c are cut and removed by machining after the termination of the friction stir welding.

That is, the friction stir welding according to the third embodiment is a friction stir welding method for a metal material in which the rectangular members to be welded 14 and 15 made of a metal material having an angular sectional shape are butt-welded together along the longitudinal direction. In the friction stir welding technique, each of the members to be welded 14 and 15 is provided with the excess thickness portions 48a, 48b and 48c that protrude as extensions of the weld-end edge portions on four sides of each of the butt surfaces.

The friction stir welding is completed by performing:

the welding first step S21 of welding the butt surfaces of the members to be welded 14 and 15 along one side by the welding tool 10, and terminating the butt welding along the one side immediately before the excess thickness portions 48a;

the filling step S22 of inserting the welding tool 10 from the excess thickness portions 48a to cause the plastic flow of the material subsequent to the butt welding along the one side, thereby filling the probe hole 28a remaining after the welding first step 21;

the welding second step S23 of performing welding, continuously from the filling step S22, along a lateral side (one of the member side surfaces B) leading from the one side, and terminating the butt welding along the lateral side immediately before the second excess thickness portions 48b;

the lateral-side filling step S45 of inserting the welding tool 10 from the second excess thickness portions 48b to cause the plastic flow of the material subsequent to the butt welding along the lateral side, thereby filling the probe hole 28b remaining after the welding second step S23;

the welding third step S42 of welding the butt surfaces of the members to be welded 14 and 15 along another side (the member lower surface C) opposite to the previous one side continuously from the lateral-side filling step S45, and terminating the butt welding along the another side immediately before the third excess thickness portions 48c;

the another-side filling step S46 of inserting the welding tool 10 from the third excess thickness portions 48c to cause the plastic flow of the material subsequent to the butt welding along the another side as the member lower surface C, thereby filling the probe hole 28c remaining after the welding third step S42; and welding the butt surfaces of the members to be welded 14 and 15 along another lateral side opposite to the previous lateral side continuously from the another-side filling step S46, and terminating the butt welding along the another lateral side at the center portion of the another lateral side by stopping the welding tool 10 in mid-course, or by stopping the welding tool 10 after turning back the welding tool 10 from a lateral edge.

As mentioned above, by the friction stir welding according to the third embodiment, there can be obtained the joint structure in which the metal members 13 with the complicated shape portions (the angular portions) in the rectangular sections are welded together over the entire periphery by butt-welding the members to be welded 14 and 15. A metal material welded body 40A having the joint structure over the entire periphery can thus be provided. In the welded body 40A, the probe holes 28a, 28b and 28c and the unwelded portion do not remain in the three surfaces with the stress concentration portions at which stress is concentrated except for one of the member side surfaces B at which no stress is concentrated. Accordingly, the welded strength can be improved, the mechanical and physical strength can also be improved, thereby providing the favorable appearance quality (weld quality).

According to the third embodiment, the probe hole 28 remains only in one position of the surface, to which less stress is applied, e.g., the member side surface B, in the metal members 13 with the rectangular sections after the members 14 and 15 are friction-stir-welded over the entire periphery. Thus, the high weld strength can be obtained without remaining the stress concentration portion.

Fourth Embodiment

FIGS. 19 to 27

A fourth embodiment of the present invention will be described hereunder with reference to FIGS. 19 to 27.

The fourth embodiment represents an example, for constituting a metal material welded body 55, in which members to be welded 51 and 52 of metal members 50 made of aluminum or aluminum alloy and provided with complicated shape portions having an angular sectional shape are butt-welded together under conditions for performing the friction stir welding shown in FIG. 20.

In the friction stir welding according to the fourth embodiment, the metal members 50 made of, for example, A6061-T6 expanded material is used. By butting and welding the members to be welded 51 and 52, the metal material welded body 55, in which the probe hole 28 does not remain in the member upper surface A at which the stress is concentrated, is provided.

Figure 19:
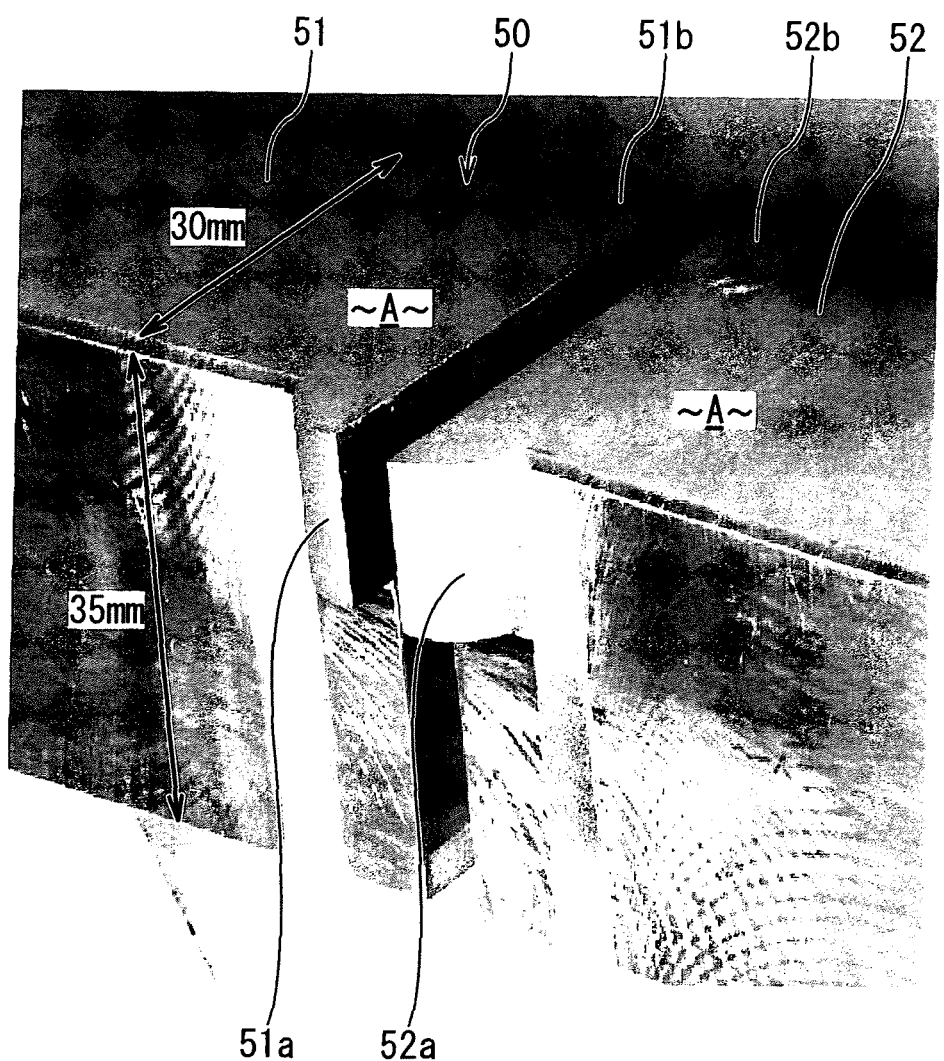
FIG. 19 is a photograph showing a perspective structure of workpieces as members to be welded in in a friction stir welding process according to a fourth embodiment of the present invention.

The prepared and used welding tool 10 is one having a tool shape with a columnar probe as shown in FIG. 5A, having, dimensions in shape, a shoulder diameter φA of 12 mm, a probe diameter φB of 6 mm, and a probe length L of 6 mm, such as shown in FIG. 20. The metal members 50 are provided with semi-columnar excess thickness portions 51a and 51b; 52a and 52b on the member side surfaces B on both the sides of the member upper surface A as shown in FIG. 19. An excess thickness portion having, in dimensions in the shape, a curvature radius R of 6 mm, an excess thickness portion length Dc of 4 mm, and an excess thickness portion depth D of 12 mm is used as the excess thickness portions 51a and 51b; 52a and 52b.

In the friction stir welding according to the fourth embodiment, the welding first step S21, the filling step S22, and the welding second step S23 are performed in a manner similar to the friction stir welding described in the first embodiment to perform the butt welding. Thereafter, the third welding step S42 is performed to weld the member side surface B opposite to that in the welding second step S23 downwardly from the upper side as shown in FIG. 21, thereby terminating the friction stir welding.

The probe holes 28 and 28 remain in lower portions of both the member side surfaces B after the termination of the friction stir welding. The remaining excess thickness portions 51a and 51b; 52a and 52b are removed by machine working.

The friction stir welding according to the fourth embodiment was performed by using the welding tool 10 made of SKD61 under the friction stir welding conditions shown in FIG. 20 in which the welding tool 10 is driven at a rotational speed of 1,500 rpm, a tool insertion speed of 20 mm/min in the filling step S22 and at a feed rate of 100 mm/min. Thus, the metal material welded body 55 was provided.

Figure 21:
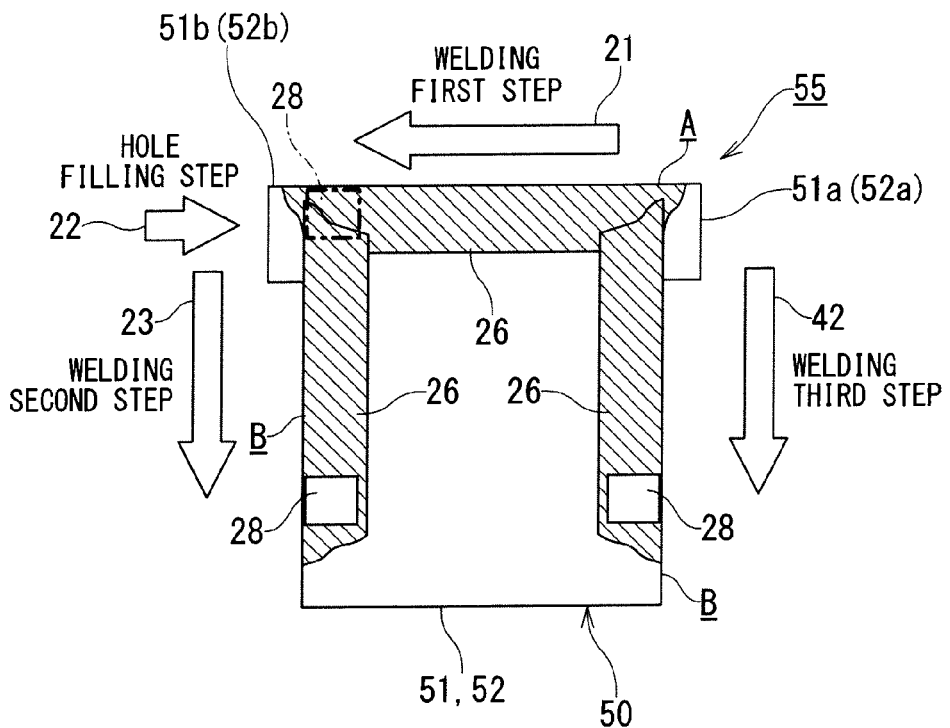
FIG. 21 is an illustrated sectional view of an example product (a metal material welded body) manufactured in the fourth embodiment of the present invention.

The metal material welded body 55 provided as described above has a weld sectional structure as shown in FIG. 21. The probe hole 28 in the member upper surface A remaining after the welding first step S21 was filled and disappeared by the plastic flow of the material of the excess thickness portions 51b and 52b or the like by performing the filling step S22 and the welding second step S23.

In the process mentioned above, there is obtained a joint structure in the metal material welded body 55 provided by butt-welding by the friction stir welding according to the fourth embodiment. In such joint structure, the probe holes 28 and 28 exist only in the lower portions of the member side surfaces B on both sides at which no stress is concentrated, and the probe hole or the unwelded portion does not remain in the member upper surface A with the stress concentration portion at which stress is concentrated.

Figure 22:
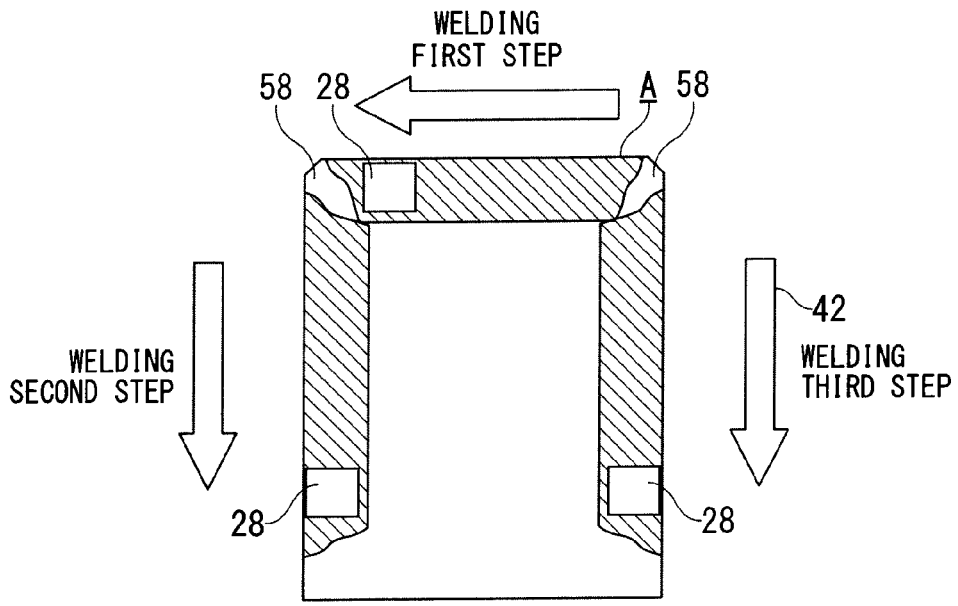
FIG. 22 is an illustrates sectional view of a conventional product shown in comparison with the example product in FIG. 21.

In comparison of the metal material welded body 55 with a conventional product provided by conventional friction stir welding, a member to be welded is not provided with an excess thickness portion in the conventional product as shown in FIG. 22. Thus, when the conventional product is provided by butt-welding under the same friction stir welding conditions by using the welding tool 10 as in the fourth embodiment, the product provides the weld sectional structure as shown in FIG. 22. In the conventional product, the probe hole 28 formed in the welding first step S21 remains in the member upper surface A as the stress concentration portion at which the stress is concentrated, and unwelded portions 58 and 58 remain in the complicated shape portions (the angular portions) of the member upper surface A. Thus, the weld strength between the members to be welded is deteriorated, and the favorable welding quality cannot be expected.

Figure 23:
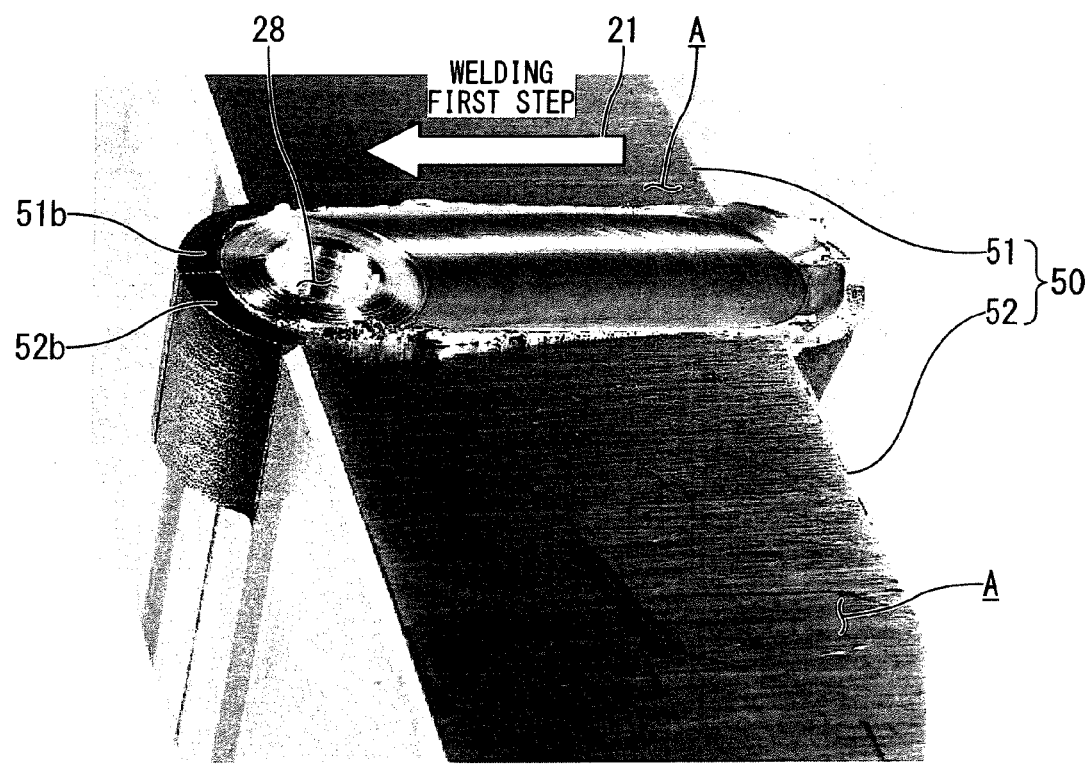
FIG. 23 is a photograph showing a perspective structure of a welded state after performing the welding first step by butt-welding the members to be welded in the fourth embodiment of the present invention.

Moreover, when the members to be welded 51 and 52 of the metal members 50 are butted and friction-stir-welded along the member upper surface A in the welding first step S21 of the fourth embodiment, the probe hole 28 remains in the member upper surface A of the butted surface by the welding tool 10 as shown in FIG. 23.

Figure 24:
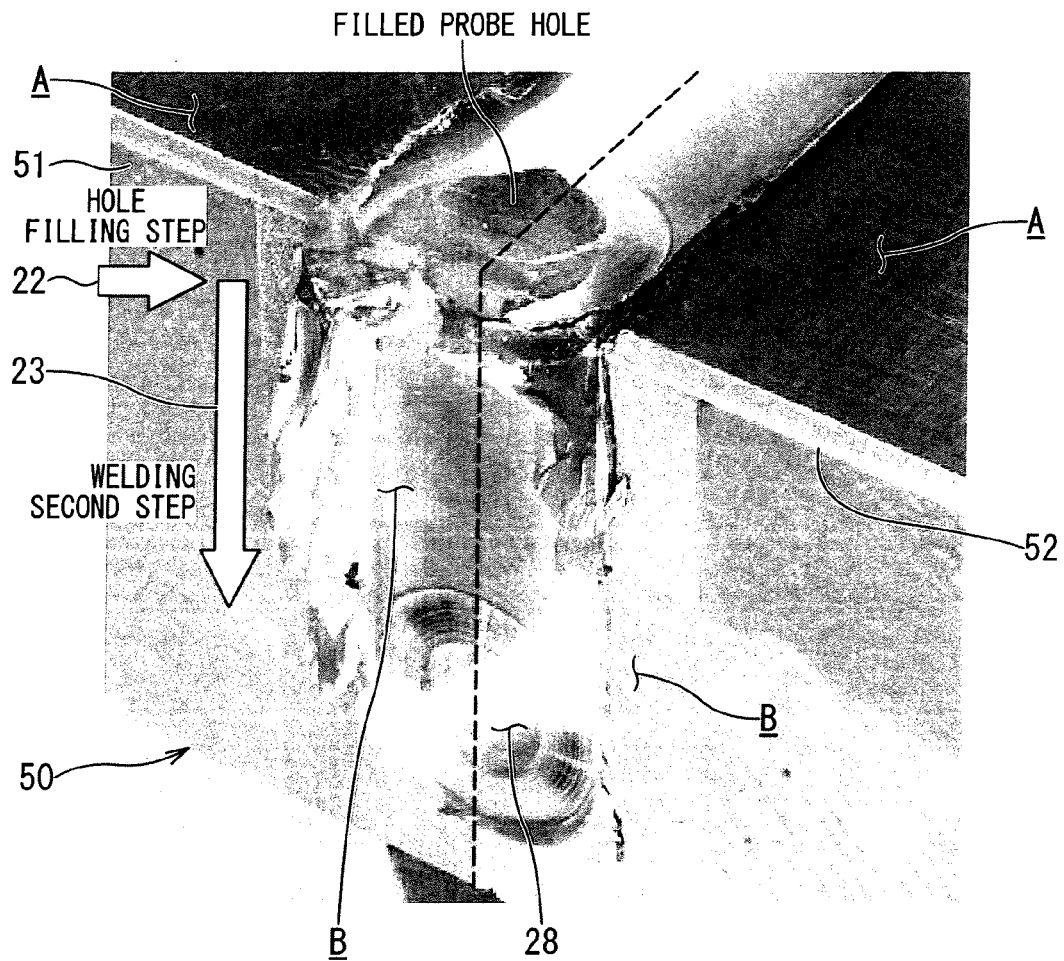
FIG. 24 is a photograph showing perspective structure of an example product of a welded state after performing the welding second step in the fourth embodiment of the present invention.
Figure 25:
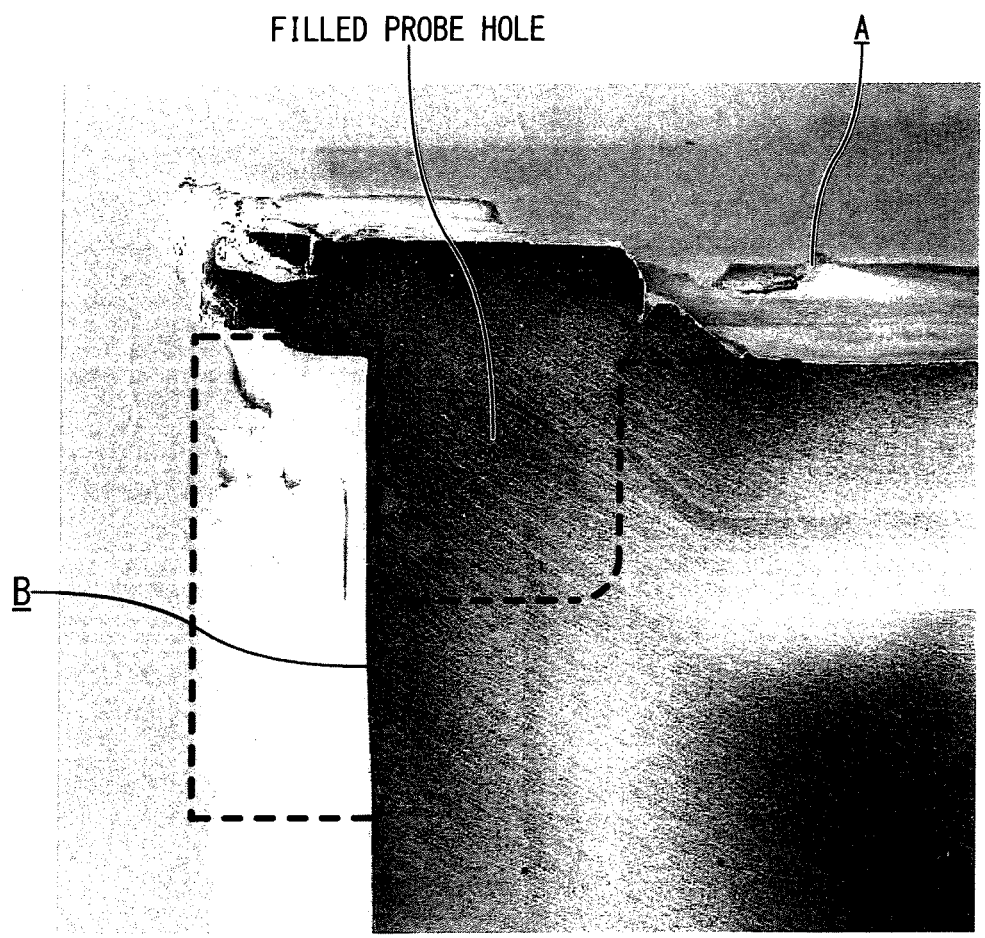
FIG. 25 is a photograph showing a sectional view of the example product illustrating a weld section after performing the welding second step similarly to FIG. 24.

However, the probe hole 28 in the member upper surface A remaining in performing the welding first step S21 is filled with the material of the excess thickness portions 51b and 52b, and the member in the member side surface plastically flowing into the probe hole 28 at a time when the welding tool 10 10 is inserted from the excess thickness portions 51b and 52b in the filling step S22 as shown in FIGS. 23 and 24. The probe hole 28 in the member upper surface A is thus filled and the probe hole hence disappears by the plastic flow of the material in the filling step S22 and the subsequent welding second step S23.

Further, when the probe hole 28 in the member upper surface A is filled and the probe hose hence disappears, the butt welding can be performed with no weld defects such as the probe hole and the unwelded portion in the member upper surface A at which the stress is concentrated.

Figure 26:
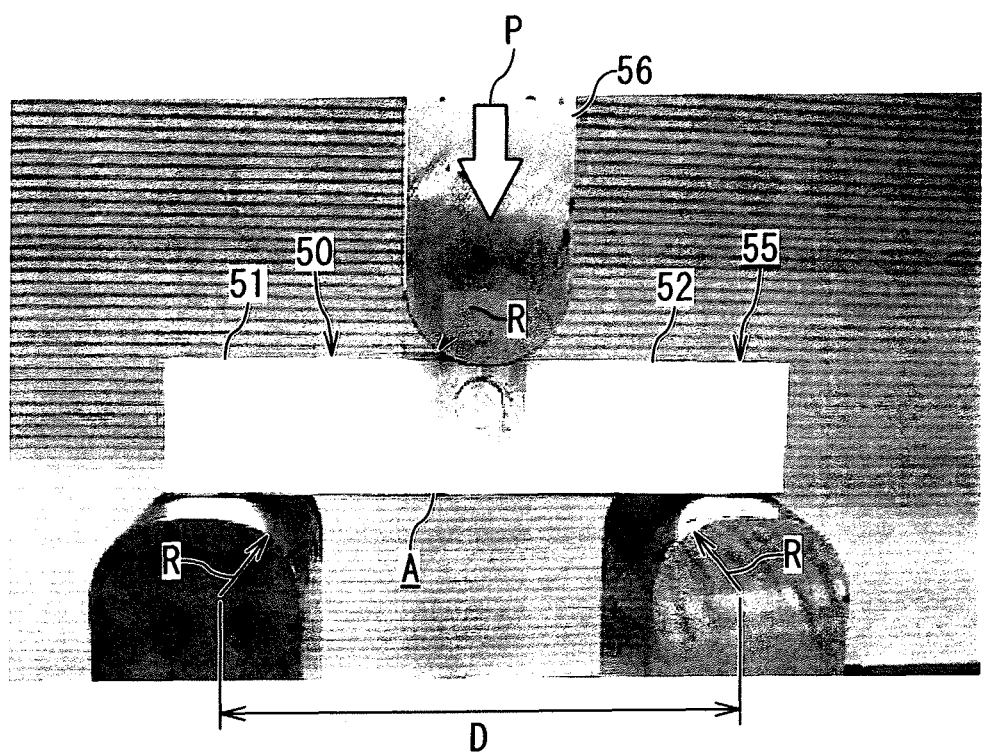
FIG. 26 is a photograph showing a structure of a state before a bend test on the example product by a testing machine.

After providing the metal material welded body 55 by butt-welding the members to be welded 51 and 52 of the metal members 50 by the welding second step S23 and the welding third step S42, and after cutting the excess thickness portions 51a and 51b; 52a and 52b remaining on the metal material welded body 55 by the friction stir welding, a bend test was performed on the metal material welded body 55 in a state shown in FIG. 26.

In the bend test, the metal material welded body 55 was supported on both ends at a support interval of, for example, 120 mm with the member upper surface A being directed downward. A test piece 56 was pressed against a center portion of the metal material welded body 55, and a bending load was applied from the upper side. The test piece 56 having a curvature radius R (R=20 mm) was raised and lowered. The result of the bend test as described above performed on the metal material welded body 55 as an example product are shown in FIG. 27.

Figure 27:
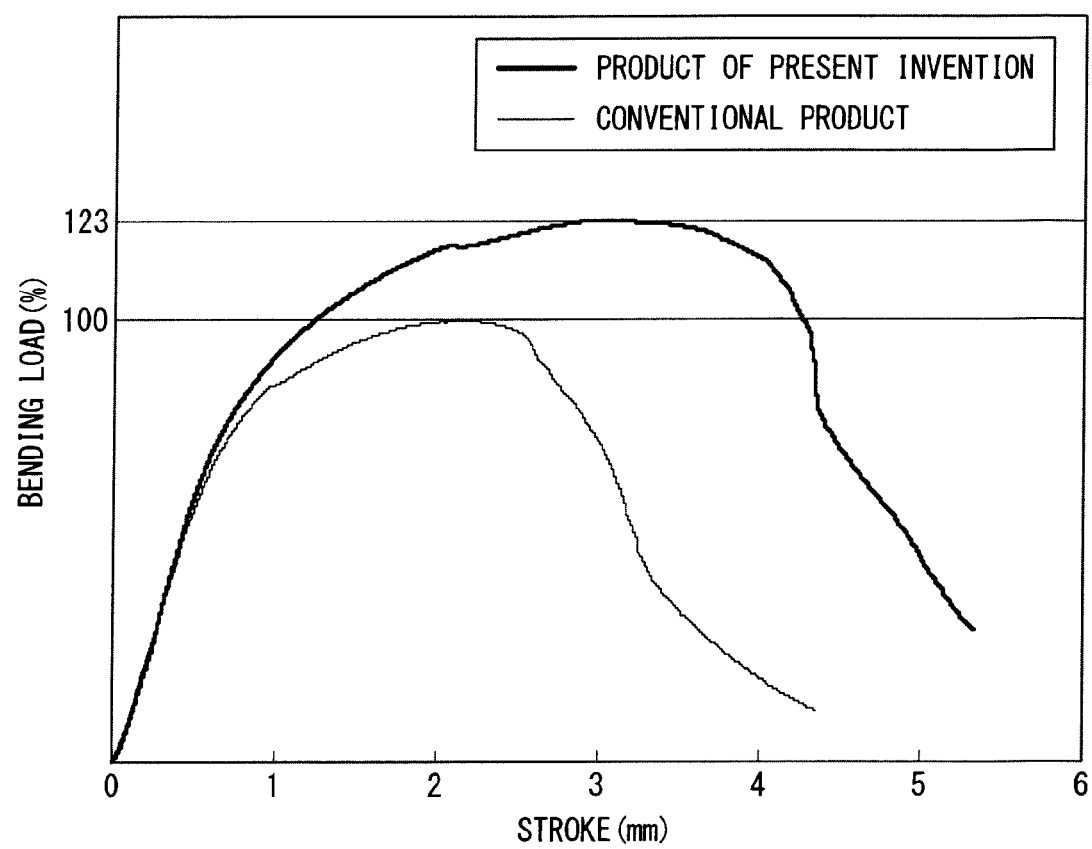
FIG. 27 is a graph illustrating a bend test result of the example product in FIG. 26 and the conventional product.

According to the bend test result in FIG. 27, it has been confirmed that bend strength is improved by 23% in the metal material welded body 55 as the example product as compared to the conventional product shown in FIG. 22. Thus, the present invention is superior to in comparison with the conventional product.

As described and explained hereinbefore, according to the present invention, there is provided a friction stir welding method for a metal material for longitudinally welding members to be butted and then welded with complicated shape portions in section at end portions, and the friction stir welding method generally includes the steps of: preparing members to be welded and formed with excess thickness portions and a welding tool provided with a probe for welding the members to be welded while rotating the welding tool in a manner of abutting against the members to be welded, the excess thickness portions being formed so as to protrude on extension surfaces of at least one side weld end portions of butt surfaces of the members to be welded; performing a first welding to the members to be welded so as to weld the butt surfaces of the members to be welded along one side and terminating the butt welding by using the welding tool along the one side surfaces and terminating the first welding immediately before the excess thickness portions; inserting the welding tool from the excess thickness portion to cause plastic flow of the metal material subsequent to the butt-welding along the one side to thereby fill a probe hole remaining in the first welding step after removing the welding tool from the members to be welded; and performing a second welding continuously from the filling step along another one side leading from the one side mentioned previously in the preparing step of the members to be welded.

In another embodiment, the friction stir method may be performed to but weld members having rectangular shaft having four side surface. In such case, the friction stir welding process is performed, as simply speaking, the respective steps of the friction stir welding performed in the above method may be repeated to the respective four side surfaces, but selectively in side surfaces to be formed with extension surfaces.

In any case, the welding process is performed by inserting a welding tool provided with a probe between surfaces of the members to be abutted and then welded, while rotating the welding tool. After such welding is ended, a probe hole formed by removing the probe is filled with. This step performed with respect to the side portions of the members to which protruded extension portions are provided.

In the present invention, by using the above friction stir welding method, a metal material welded body is produced.

It is further to be noted that the present invention is not limited to the described embodiments, and many other changes and modifications or alternations may be made without departing from the appended claims.

What is claimed is:

1. A friction stir welding method for a metal material for longitudinally welding members to be butted and then welded with at end portions, the method comprising:
  preparing members to be welded and formed with excess thickness portions and a welding tool provided with a probe for welding the members to be welded while rotating the welding tool in a manner of abutting against the members to be welded, the excess thickness portions being formed so as to protrude on extension surfaces of at least one side weld end portions of butt surfaces of the members to be welded;

performing a first welding to the members to be welded so as to weld the butt surfaces of the members to be welded along one side and terminating the butt welding by using the welding tool along the one side of the butt surfaces and terminating the first welding at the beginning of the excess thickness portions;

inserting the welding tool from the excess thickness portion to cause plastic flow of the metal material subsequent to the butt-welding along the one side to thereby fill a probe hole remaining in the first welding step after removing the welding tool from the members to be welded; and performing a second welding continuously from the filling along another one side leading from the one side mentioned previously in the preparing of the members to be welded.

2. The friction stir welding method for a metal material of claim 1, wherein the filling is performed with a press jig in abutment with the weld-end portion on the one side mentioned in the first welding.

3. The friction stir welding method for a metal material of claim 1, wherein the excess thickness portion is removed by machining working after the termination of the welding in the friction stir welding in which the members to be welded are butt-welded along the longitudinal direction.

4. A metal material welded body to be obtained by longitudinally welding butted members to be welded made of a metal material and provided at end portions by a friction stir welding method, wherein each of the members to be welded is provided integrally with an excess thickness portion that protrudes as an extension of a weld-end edge portion on at least one side of a butt surface, a butt welding process along at least one side of the members to be welded by a welding tool provided with a probe, while rotating the welding tool in a manner abutting against the members to be welded, is terminated at the beginning of the excess thickness portion when the butt surfaces of the members to be welded are welded together, a probe hole remaining in the weld-end edge portion formed by removing the probe from the members during the friction stir welding on the one side is filled by plastic flow of a material caused by inserting the welding tool from the excess thickness portion subsequent to the butt welding along the one side, an outer peripheral portion of the probe hole filled by the plastic flow of the material remaining recognizable, and the excess thickness portion is removed by machining after termination of the friction stir welding.

5. The metal material welded body of claim 4, wherein the members to be welded each has a rectangular shape in section, and weld surfaces of the members to be welded are butt-welded sequentially along four sides of the members by the welding tool.

* * * * *